United States Patent
Weissert et al.

[11] Patent Number: 6,015,182
[45] Date of Patent: Jan. 18, 2000

[54] VEHICLE DOOR STRUCTURES INCORPORATING HYDROFORMED ELEMENTS AND PROCESSES FOR ASSEMBLING SUCH ELEMENTS

[75] Inventors: Ulrich Weissert, Rochester; Okan Goenueldinc, Birmingham; Marco Cercone, Troy; Ross Winslow, Royal Oak, all of Mich.; Andy Wolf, Parkland, Fla.; Robert Koehr, Harrison Township, Mich.; Rolf Heyll, Renningen, Germany

[73] Assignee: Porsche Engineering Services, Troy, Mich.

[21] Appl. No.: 09/257,029

[22] Filed: Feb. 25, 1999

Related U.S. Application Data

[60] Provisional application No. 60/076,354, Feb. 27, 1998.

[51] Int. Cl.⁷ .................................. B60J 5/04; B60J 5/10
[52] U.S. Cl. .................................. 296/146.6; 296/146.5; 296/146.8; 29/522.1; 49/502; 72/61
[58] Field of Search ............................ 296/106, 146.1, 296/146.5, 146.6, 146.8, 146.2, 146.15, 201; 72/60, 61; 49/502; 29/522.1, 523

[56] References Cited

U.S. PATENT DOCUMENTS

| | | |
|---|---|---|
| 4,648,208 | 3/1987 | Baldamus et al. . |
| 4,868,964 | 9/1989 | Schmitz . |
| 5,232,261 | 8/1993 | Kuroda et al. . |
| 5,277,469 | 1/1994 | Klippel . |
| 5,333,775 | 8/1994 | Bruggemann et al. . |
| 5,408,785 | 4/1995 | Heim et al. . |
| 5,581,947 | 12/1996 | Kowall et al. . |
| 5,720,092 | 2/1998 | Ni et al. . |
| 5,845,382 | 12/1998 | Schultz et al. . |
| 5,862,877 | 4/1999 | Horton et al. . |

*Primary Examiner*—D. Glenn Dayoan
*Assistant Examiner*—Paul Chenevert
*Attorney, Agent, or Firm*—John A. Artz

[57] ABSTRACT

A vehicle side door or hatchback structure incorporates at least one hydroformed component. In one configuration, a window frame, a door frame and a reinforcement member are press-fit together by pressurized fluid during a hydroforming process to join the frames and the reinforcement member together. In another configuration, a vehicle hatchback frame subassembly includes a one-piece hydroformed window frame with a central portion disposed between opposing end portions. Inner and outer panels are attached to each other and secured to the opposing end portions of the window frame. In yet another configuration, a vehicle door and window frame subassembly includes a hydroformed one-piece first door frame, a roll formed second door frame and a reinforcement member secured to the tubular one-piece first door frame. An outer front panel is attached to the reinforcement member by at least one mirror bracket. In a modification of this configuration, a mirror bracket which additionally defines a door hinge element interconnects an end of the reinforcement member to an end of the tubular one-piece first door frame. In a further configuration, a frameless vehicle door subassembly includes a lower tubular member and an upper tubular member secured together at their ends by a pair of hydroformed members.

38 Claims, 14 Drawing Sheets

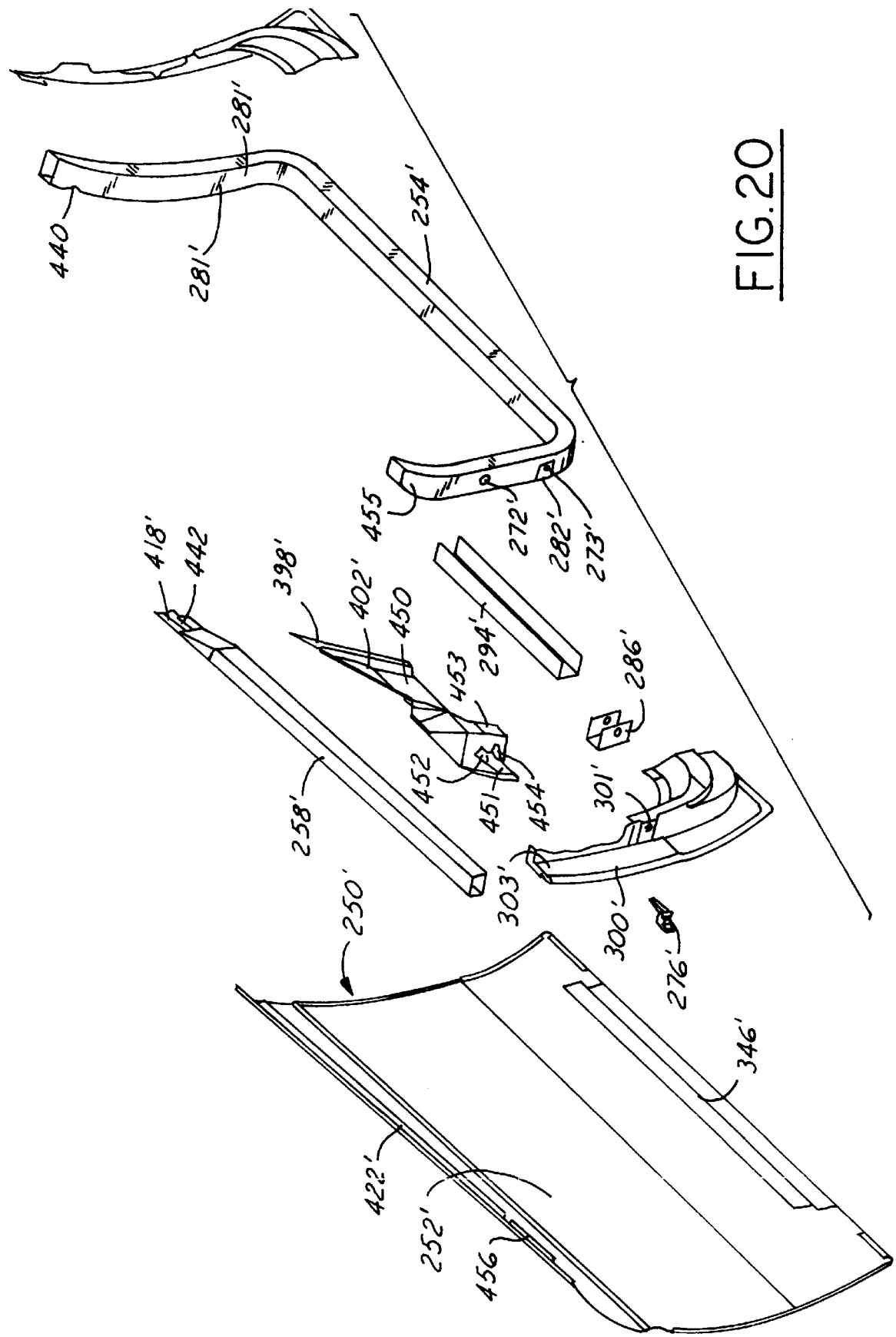

VEHICLE DOOR STRUCTURES INCORPORATING HYDROFORMED ELEMENTS AND PROCESSES FOR ASSEMBLING SUCH ELEMENTS

CROSS-REFERENCE TO RELATED APPLICATIONS

This application claims priority of provisional application No. 60/076,354, filed Feb. 27, 1998, the entire disclosure of which is hereby incorporated by reference.

TECHNICAL FIELD

The present invention relates to vehicle structures and components such as door, window and hatchback structures, which include one or more hydroformed steel structural components.

BACKGROUND AND SUMMARY OF THE INVENTION

The present invention relates to vehicle structures made of steel structural components or elements, one or more of which is made by a process known as hydroforming. Hydroforming per se is known and involves placing a tube or some other hollow element into an appropriate mold or tool, locking off the ends of the tube or other hollow element, and then forcing a liquid, such as water, at a high pressure into the interior of the tube. Pressures which are quite high are necessary to produce hydroformed elements having sharp bends or steps incorporated in them.

The result of the hydroforming process is essentially to deform or "blow up" the tube so that it conforms to the inner surface of the mold or tool. Some limitations on the use of hydroforming are present, since the material forming the tube can be stretched or deformed only to a certain degree. Also, the hydroforming process is quite time consuming as compared to conventional stamping or similar deformation processes. However, assuming that a tube to be hydroformed has an approximately constant thickness, it will be stretched or deformed evenly over its surface area. Hydroformed elements, therefore, have certain advantageous strength characteristics.

SUMMARY OF THE INVENTION

It is a primary object of this invention to provide a vehicle door, window or hatchback structure which incorporates at least one hydroformed component within the structure.

In one preferred configuration, a vehicle door and window frame subassembly includes a window frame defining first ends and a door frame defining second ends, with each of the first ends received within one of the second ends. A reinforcement member defines third ends forming receptacles within which the first and second ends are received. The first, second and third ends are press-fit together by pressurized fluid during a hydroforming process to join the frames and the reinforcement member together and form the door and window frame subassembly. Flanges are defined in the receptacles in order to position the first, second and third ends properly with respect to one another. The window frame includes reduced diameter sections received within the second ends and steps which abut the flanges and position the first ends relative to the receptacles. Each of the second ends abuts an underside of one of the flanges. The subassembly is made by placing ends of hollow tubular preformed window and door frames into the receptacles of the reinforcement member and supplying pressurized fluid to interiors of the hollow tubular frames in order to press-fit the ends within the receptacles.

In another configuration, a vehicle hatchback frame subassembly includes a tubular one-piece window frame having a hollow interior and including a central portion disposed between opposing end portions. Inner and outer panels are attached to each other and secured to the opposing end portions of the window frame. The window frame is provided with a particular cross-sectional configuration by supplying pressurized fluid to the hollow interior during a hydroforming operation. The vehicle hatchback frame subassembly includes hinge elements secured within recesses defined in the central portion of the window frame. The window frame is welded to the outer panel, and the inner panel is hemmed to the outer panel and welded to the window frame. The window frame, moreover, defines a ledge which supports a hatchback glass element.

Steps are defined on the window frame and form boundaries between the end portions and the central portion. The opposing end portions define respective recesses, and the outer panel defines a flange having an underside received within the respective recesses. This subassembly is made by forming the window frame, which has a tubular one-piece structure, a hollow interior, and opposing end portions, by supplying pressurized fluid to the hollow interior during a hydroforming operation, attaching the window frame to an outer hatchback panel, hemming an inner hatchback panel to the outer hatchback panel, and attaching the inner hatchback panel to the window frame. The window frame is attached to the outer hatchback panel by welding. Similarly, the inner hatchback panel is attached to the window frame by welding. Laser welding is utilized.

In yet another configuration, a vehicle door and window frame subassembly includes a tubular one-piece first door frame having a hollow interior and defining first ends and a second door frame defining second ends, with each of the second ends being connected to the first ends. A reinforcement member defining third ends is secured to the tubular one-piece first door frame, which has a cross-sectional configuration produced by supplying pressurized fluid to its hollow interior during a hydroforming operation. In this configuration, the second door frame is a roll formed upper door frame. The subassembly further includes an outer front panel attached to the reinforcement member by at least one mirror bracket. The second door frame is welded to the first door frame.

In a modified configuration which is similar to that mentioned immediately above, a vehicle door and window frame subassembly includes a tubular one-piece first door frame having a hollow interior and defining first ends and a reinforcement member defining second ends, with one of the second ends secured to a portion of the tubular one-piece first door frame at a location adjacent one of the first ends. A bracket interconnects the other of the second ends to the other of the first ends. Again, the first door frame has a cross-sectional configuration produced by supplying pressurized fluid to the hollow interior. The particular location adjacent one of the first ends is defined by a notch which facilitates relative positioning of the first door frame and the reinforcement member. The bracket further defines a hinge element, forming part of a door hinge, which includes upper and lower ears integrally formed with the bracket.

In still another embodiment, a door frame subassembly includes a lower ultra-high strength steel cross member, a hydroformed steel latch tubular member, a hydroformed steel hinge tubular member and an upper high strength steel tubular member. An inner rear panel member, inner front panel member, and outer skin panel member are attached to the door frame subassembly, as well as a mirror flag member. Preferably, the inner front panel member is a Taylor-blanked component.

BRIEF DESCRIPTION OF THE DRAWINGS

Various embodiments of the invention will now be described in connection with associated drawing figures. The drawing figures simply provide illustrations of the various embodiments and are not to be considered to limit the scope of the claims in any way.

FIG. 20 is an exploded perspective view of a fourth embodiment of the invention in which a lower door frame of a "frameless" front door of a convertible-type automobile is hydroformed.

DESCRIPTION OF THE PREFERRED EMBODIMENTS

Each of the embodiments which will be described includes at least one element made by a hydroforming process. Such elements are formed of moderate to high strength steel in order to limit costs and provide ready recyclability.

Figure 1:
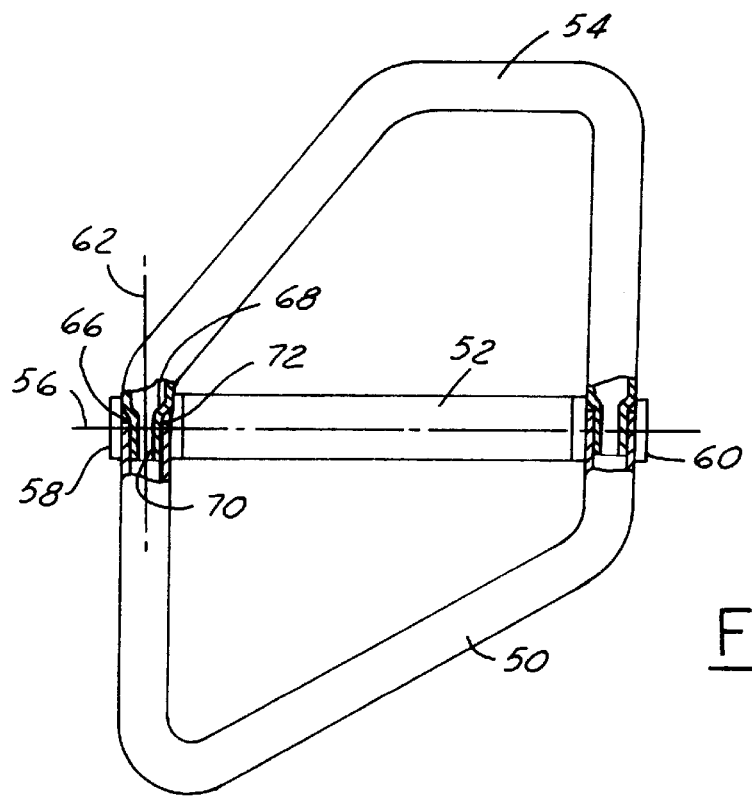
FIG. 1 is a side view, partly in section, showing a first embodiment of the invention in which an automotive door and window frame subassembly is totally hydroformed.

FIG. 1 schematically illustrates a structural member which constitutes a totally hydroformed door and window frame subassembly for an automobile. The structural member shown in FIG. 1 includes a tubular hollow door and side intrusion preventing beam or frame 50, a beltline reinforcement member 52, and a hollow window frame 54. The frames 50 and 54 and the reinforcement member 52 are all joined together during a hydroforming operation. The beltline reinforcement member 52 may be a tubular or otherwise hollow element which extends along a longitudinal axis 56. All elements are made of high strength steel. Opposite ends of the beltline reinforcement member, shown in section in FIG. 1, define receptacles 58 and 60 by which the elements of the frame subassembly are interconnected. The receptacles 58 and 60 have identical constructions. Since the receptacles 58 and 60 have the same constructions, only a description of the receptacle 58 will be provided.

The receptacle 58 has a hollow cylindrical construction and extends along an axis 62. As shown, the axis 62 is oriented approximately perpendicularly relative to the axis 56, although other orientations clearly are possible. A radially inwardly extending circumferential positioning flange 66 is defined at a selected location between opposite open ends of the receptacle.

The frames 50 and 54 are pre-bent into the shapes shown in FIG. 1 before being joined together with the beltline reinforcement member. Each of the opposite ends of the window frame 54 is provided with a step 68 delimiting the central portion of the frame and a reduced diameter end section 70. To assemble the hydroformed door and window frame subassembly, the receptacle 58 of the beltline reinforcement member 52 is first placed over an end 72 of the door frame 50 so that the end 72 abuts a lower side of the circumferential flange 66. The reduced diameter end section 70 of the window frame 54 is then inserted into the receptacle 58 and the end 72 of the door frame 50 until the outside surface of the step 68 abuts an upper side of the circumferential flange 66. The opposite end section of the window frame 54 is similarly inserted into the receptacle 60.

At this point, pressurized fluid is supplied, through an appropriate access location, to the closed-off interiors of the door and window frames 50 and 54 to perform the hydroforming operation. The pressure applied to the interiors of the frames 50 and 54 during the hydroforming operation produces sufficient deformation to cause a tight and secure press fit among the receptacle 58, the reduced diameter end section 70 of the window frame 54 and the end 72 of the door frame 50 to join these elements together. A press fit is produced among the receptacle 60 and the other ends of the window frame 54 and the door frame 50 in the same fashion. No other operations, such as welding, brazing, soldering or bonding, are necessary to join the three elements constituting the illustrated frame subassembly.

Figure 2:
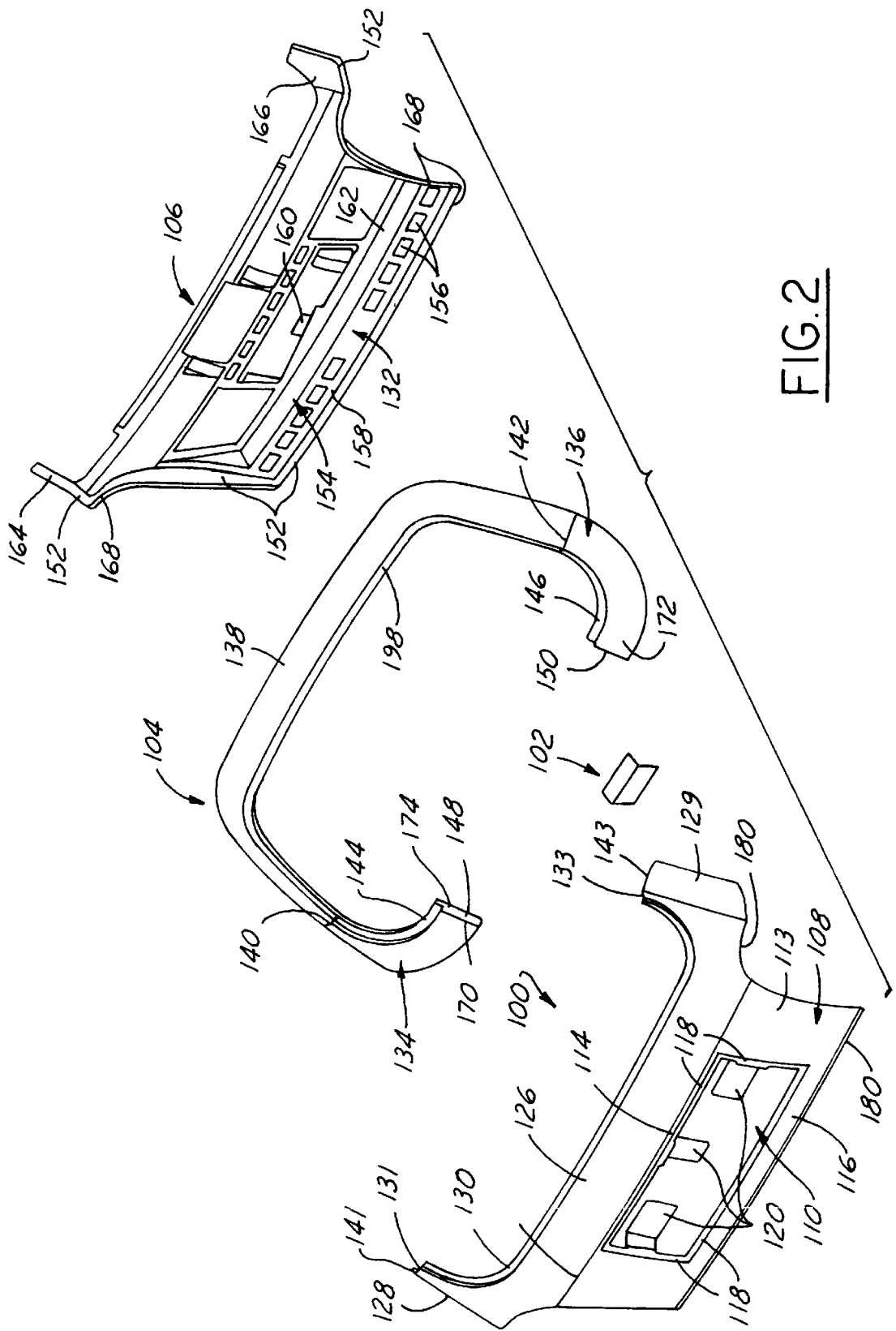
FIG. 2 is an exploded perspective view of a second embodiment of the invention in which a rear window frame of an automobile hatchback is hydroformed.

The exploded view of FIG. 2 shows another embodiment of the invention in which four individual elements are combined together to form a vehicle hatchback. These individual elements are an outer hatchback panel 100, a reinforcement bracket 102, a tubular one-piece hydroformed rear window frame 104 having a hollow interior, and an inner hatchback panel 106. All elements are made of high strength steel unless otherwise specified.

The outer hatchback panel 100 shown in FIG. 2 includes a lower panel portion 108 having a rectangular opening 110.

Left and right lateral areas 112 and 113, respectively, of the lower panel portion 108 are defined laterally outside of opposite ends of the rectangular opening 110. An upper area 114 of the lower panel portion is disposed above the rectangular opening 110, while a lower area 116 of the lower panel portion is located below the rectangular opening. The upper and lower panel portion areas 114 and 116 are formed in one piece with and extend between the lateral areas 112 and 113.

An edge area 118 is defined around the perimeter of the opening 110. Depending L-shaped bracket elements 120 are joined to opposing lateral portions and an upper portion of the edge area 118. An appropriate covering element (not shown) may be attached to and retained by the bracket elements so as to close off the opening 110.

The lower panel portion 108 terminates at a bend line 122, which separates the lower panel portion 108 from an upper panel portion 124 of the outer hatchback panel 100. The upper panel portion 124 has an intermediate area 126 adjoining bend line 122 and extending between opposing left and right lateral flange portions 128 and 129, respectively. An L-shaped flange 130 is formed at and extends along an upper edge of the outer hatchback panel and, after assembly, provides partial support for a hatchback window as will become clear.

The reinforcement bracket 102 is approximately L-shaped and is welded, at a location 132, to the inner hatchback panel 106. The bracket effectively increases the thickness of the material at the location 132. The increased material thickness provided by the bracket 102 produces reinforcement so that an appropriate hatchback lock assembly (not shown in FIG. 2) can be properly and securely mounted to the vehicle hatchback.

The hydroformed rear window frame 104 is a C-shaped single-piece element and includes opposing left and right end portions 134 and 136, respectively, and a central portion 138 interconnecting the left and right end portions. Central portion 138 has a cross-section which is slightly larger in area but approximately the same in shape as the cross-sections of the end portions 134 and 136. Steps 140 and 142 define boundaries between the end portions 134 and 136 and the central portion 138. When the panel 100 and the frame are connected together, the steps 140 and 142 abut or are adjacent to the upper edges 141 and 143, respectively, of the lateral flange portions 128 and 129. These steps also abut or are adjacent to the short upper edges 131 and 133 of laterally outer sections of the intermediate area 126. The outer surfaces of the lateral flange portions 128 and 129 are flush with the outer surface of the central portion 138 following connection of the outer hatchback panel and the rear window frame.

The end portions 134 and 136 include recesses 144 and 146 defined by an L-shaped deformation in the wall of the hydroformed tube. The L-shaped flange 130 extending along the upper edge of the outer hatchback panel has the same configuration as and fits within the recesses 144 and 146. After assembly of the vehicle hatchback, the surface of each of the recesses 144 and 146 engages and is secured to the underside of a respective portion of the L-shaped flange 130 in a manner to be described. The recesses 144 and 146 are contiguous with a recess defined by a ledge 198 of the frame 104 which will be described shortly.

The hydroformed rear window frame 104 is hollow throughout. At least one of the ends 148 and 150 provides access to the interior of the tube for pressurized fluid used for hydroforming, and a desired cross-sectional configuration of the window frame 104 is produced by this pressurized fluid.

The inner hatchback panel 106 has a one-piece construction and includes, among other parts, a perimeter flange 152, a step 154 including holes 156 in its upstanding wall or "riser" 158 and an attachment flange 160 extending upwardly and rearwardly from the approximately horizontal wall or "tread" 162 of the step 154. Outwardly facing left and right lateral surfaces 164 and 166 are defined on opposite sides of the inner hatchback panel and provide seats for receiving sides of the end portions 134 and 136, respectively, when the vehicle hatchback is assembled. The lateral edges and the lower edge of the inner hatchback panel 106 are provided with an outwardly extending attachment flange 168.

Assembly of the vehicle hatchback is performed by laser welding appropriate surfaces including the outer surfaces 170 and 172 of the hydroformed rear window frame end portions 134 and 136 to corresponding locations on inner surfaces of the outer hatchback panel 100. Then, a hemming operation is used to attach the inner hatchback panel 106 to the outer hatchback panel 100, and various surfaces of the inner hatchback panel 106, such as the lateral surfaces 164 and 166, are laser welded to corresponding areas of the end portions 134 and 136 such as the surface 174. The perimeter flange 152 assists in positioning the end portions 134 and 136. The attachment flange 168 is used in the hemming operation to attach the outer and inner hatchback panels 100 and 106 together.

Figure 3:
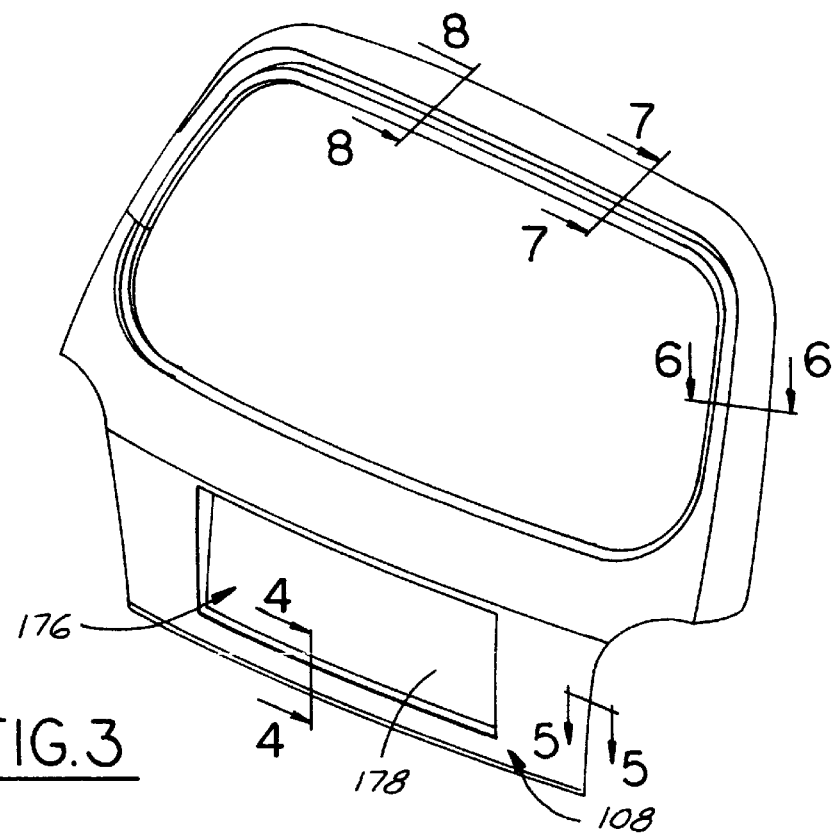
FIG. 3 is a perspective view of the second embodiment with various sections indicated.

The slightly modified construction of the assembled vehicle hatchback shown in FIG. 3 includes a lower panel portion 108 having a stamped or press-formed recess 176. This recess is closed off by a solid wall 178 integrally formed with the rest of the outer hatchback panel 108. The wall 178 takes the place of the covering element (not shown) which is to be received in the opening 110 of the construction shown in FIG. 2. The construction of the vehicle hatchback shown in FIG. 3 is otherwise the same as that of FIG. 2. In FIG. 2 and FIGS. 3–8, the same vehicle hatchback parts are indicated by the same reference numbers. The various sections in FIG. 3 will facilitate an understanding of the construction and assembly of the vehicle hatchback.

Figure 4:
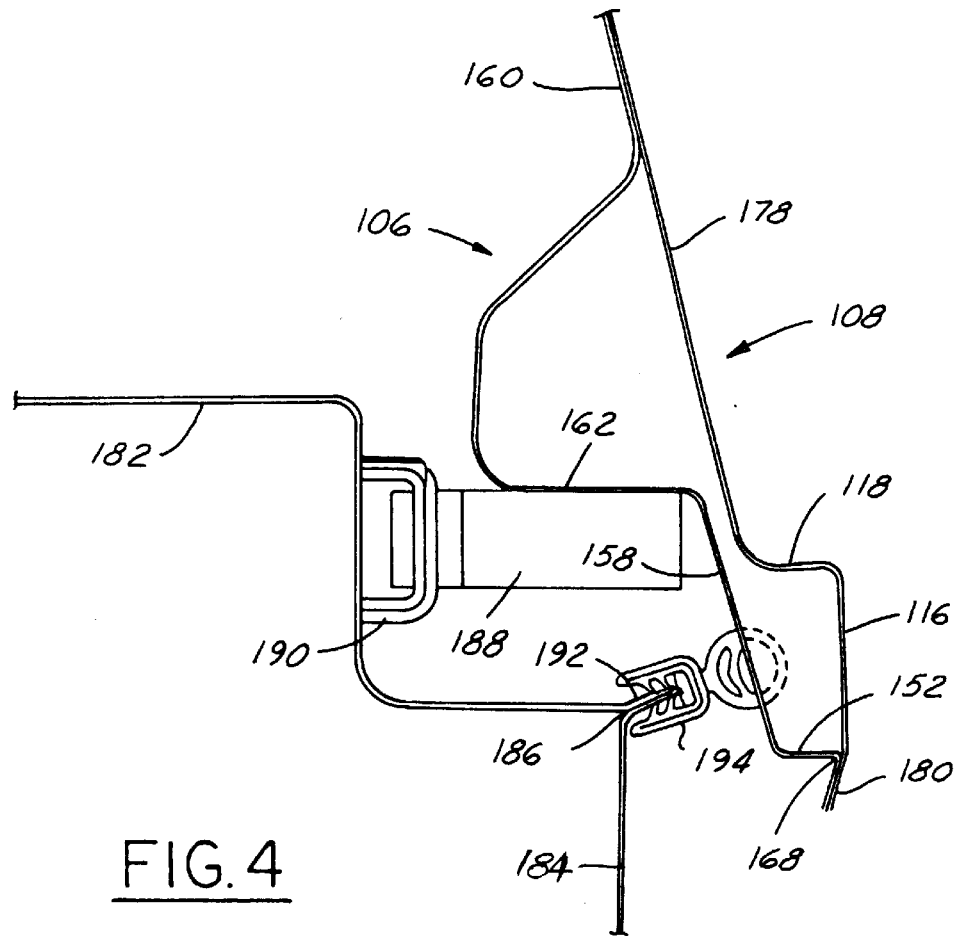
FIG. 4 is a view along section line 4—4 of FIG. 3.

FIG. 4 is a view along section line 4—4 of FIG. 3. The section line passes through the solid wall 178, the edge area 118, and the lower panel portion area 116 which are integrally formed and which together form part of the outer hatchback panel 100. The section line also passes through the attachment flange 160, the perimeter flange 152, the riser 158 and the tread 162 of the inner hatchback panel 106. The reinforcement bracket 102 has been omitted from FIG. 4 for clarity.

The results of the hemming operation are also apparent from FIGS. 4–8. The hemming operation per se is conventional. FIG. 4, for example, shows the attachment flange 168 as being sandwiched between a bent-over edge area of the lower panel portion area 116. To perform the hemming operation, an adhesive is applied to the appropriate edge areas of the outer hatchback panel 100 (e.g., the inner surface of an outer edge area 180). The inner panel is then placed against the outer hatchback panel so that this edge area 180 engages the attachment flange 168. The outer edge area 180 of the outer hatchback panel is then deformed around or hemmed over the attachment flange 168 into the configuration shown, for example, in FIG. 4.

The attachment flange 160 may also be welded in the position shown to an inner surface of the wall 178.

FIG. 4 also schematically illustrates part of a vehicle floor. Vehicle floor sections 182 and 184 are shown and are joined together at a joint 186 by, for example, welding. A hatchback lock assembly 188 is secured in an appropriate fashion (e.g., by bolts or welding) to an underside of the tread 162. The hatchback lock assembly selectively engages with and disengages from a conventional catch or latch element 190 bolted or welded to the floor section 182.

Mating portions of the floor sections 182 and 184 together define a flange 192. The flange 192 defines a seat to which a conventional seal 194 is adhesively mounted. Phantom lines in FIGS. 4–8 show the seal 194, which may be constructed in one piece, in its undeformed state when the vehicle hatchback is open.

Figure 5:
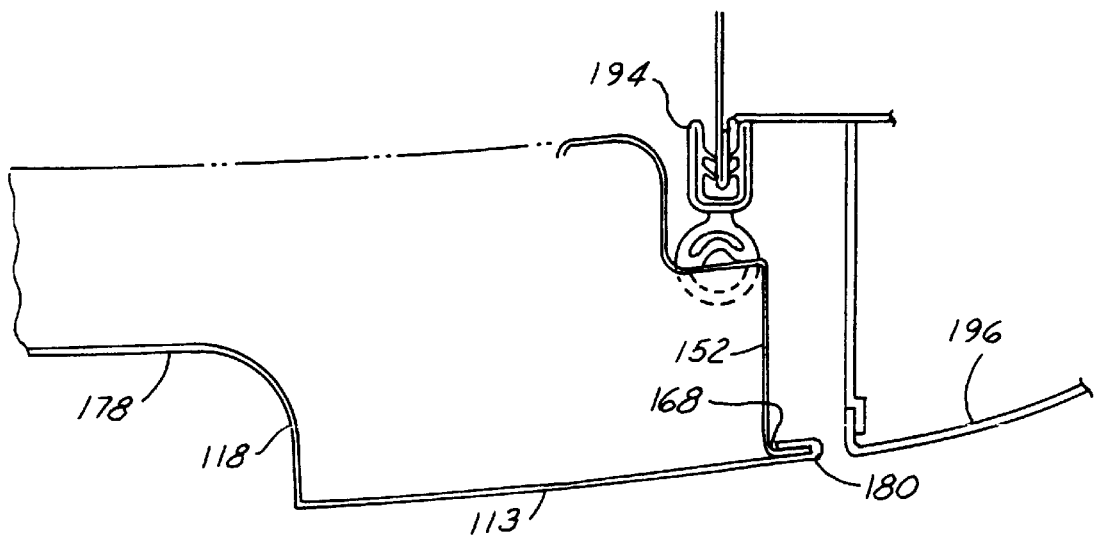
FIG. 5 is a view along section line 5—5 of FIG. 3.

The view in FIG. 5 is along section line 5—5 of FIG. 3. The section along line 5—5 passes through the solid wall 178, the edge area 118, the lateral area 113 and the edge area 180 of the outer hatchback panel 100. The section shown in FIG. 5 also passes through the perimeter flange 152 and the attachment flange 168 of the inner hatchback panel 106, as well as through a seal 194 which, at this location, is mounted on an appropriate frame or wall section of the vehicle. FIG. 5 additionally shows a rear vehicle lamp cover 196 mounted in a conventional fashion on the vehicle frame or wall section.

Figure 6:
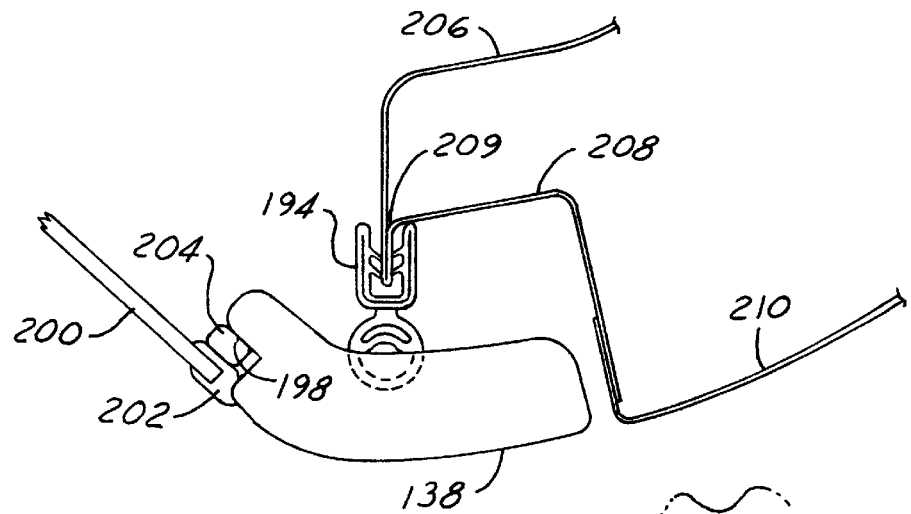
FIG. 6 is a view along section line 6—6 of FIG. 3.

FIG. 6 is a view along section line 6—6 of FIG. 3. The section illustrated in FIG. 6 shows the central portion 138 of the hydroformed rear window frame 104 and a seal 194. Also illustrated in FIG. 6 are the ledge 198 defined by the hydroformed rear window frame, a hatchback glass element 200, an elastomeric seal 202 disposed around the perimeter of the glass element 200 and an adhesive 204 by which the hatchback glass element 200 is secured to the ledge 198. The seal 202 and the adhesive 204 provide a watertight connection between the element 200 and the portion 138. An inner rear quarter panel element 206 and a gutter panel element 208 are connected together, by welding, for example, at a joint 209 defining a flange to which the seal 194 is secured. An outer body side panel 210 is conventionally connected to the gutter panel element 208.

Figure 7:
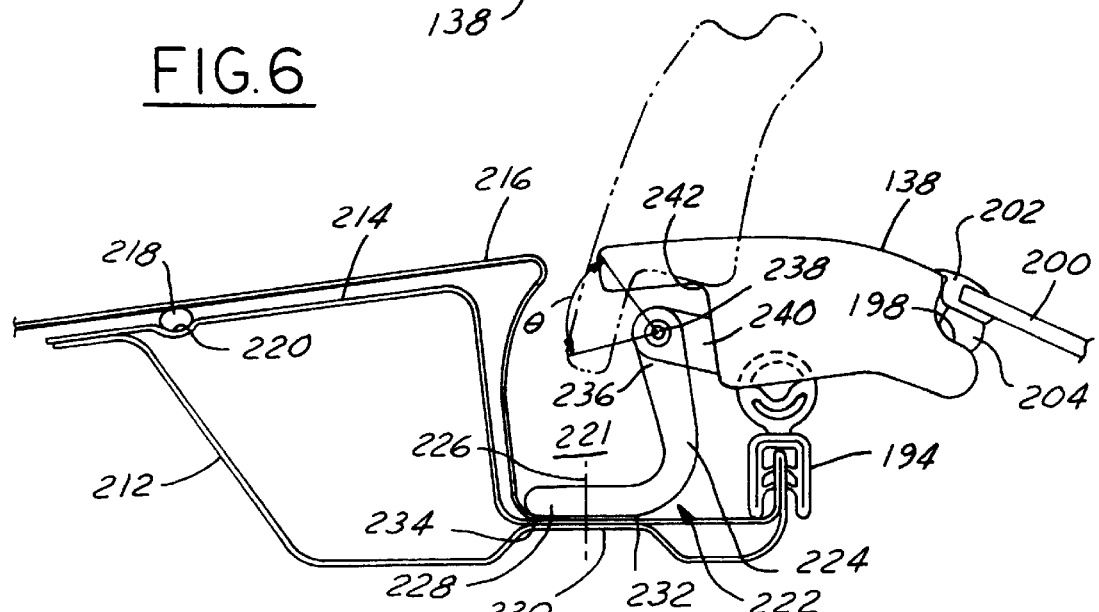
FIG. 7 is a view along section line 7—7 of FIG. 3.

The view along section line 7—7 of FIG. 3 appears in FIG. 7. The central portion 138 of the hydroformed rear window frame is again shown, as is the ledge 198, the glass element 200, the seal 202 and the adhesive 204. FIG. 7 shows a rear header lower panel 212 welded to a rear header upper panel 214. The panels 212 and 214 provide support in a conventional manner for a panel roof 216. An adhesive bead 218 is received in a groove 220 defined in the upper panel 214 and facilitates mounting of the panel roof 216 on the upper panel.

An indented recess 221 is defined by the panel roof 216 and permits the mounting of hinge assemblies 222 by which the vehicle hatchback can be opened and closed. Each hinge assembly 222 has a support 224 with a first end 228 secured, for example by a bolt extending along an axis 226, within the recess 221. Such a bolt extends through the first end 228 of the support 224, mating locations 230 and 232 of the panels 212 and 214, and a terminal end 234 of the panel roof 216. A second end 236 of each support 224 receives an axle 238 about which the vehicle hatchback pivots. Each axle is also received, in a conventional fashion, in a mounting ear 240 secured, for example by welding, within a recess 242 defined in the central portion 138 of the hydroformed rear window frame 104 at an appropriate location on the outer surface of this central portion. The hatchback, therefore, can pivot in the recess 220, about the axes of the axles 238, through an angle θ, and is rotatable between a closed position represented in solid lines and an open position represented in phantom lines in FIG. 7.

To summarize the construction of the vehicle hatchback described above, the hydroformed rear window frame 104 is laser welded to the outer hatchback panel 100. The inner hatchback panel 106 is then hemmed to the window frame 104 and laser welded to the rear window frame 104. All of the load applied at the hinge assemblies 222 is received by the one-piece hydroformed rear window frame 104.

Figure 8:
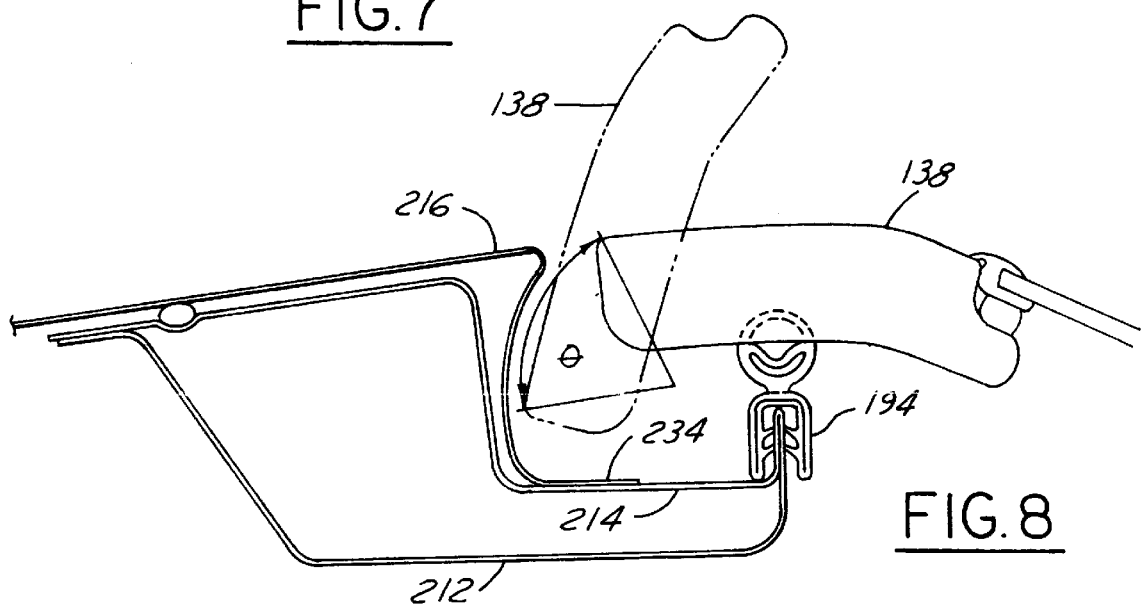
FIG. 8 is a view along section line 8—8 of FIG. 3.

FIG. 8 is a view along section line 8—8 of FIG. 3. The view shown in FIG. 8 is nearly the same as that of FIG. 7, except that FIG. 8 is a view of a location which does not include a hinge assembly 222 or a recess 242.

Figure 9:
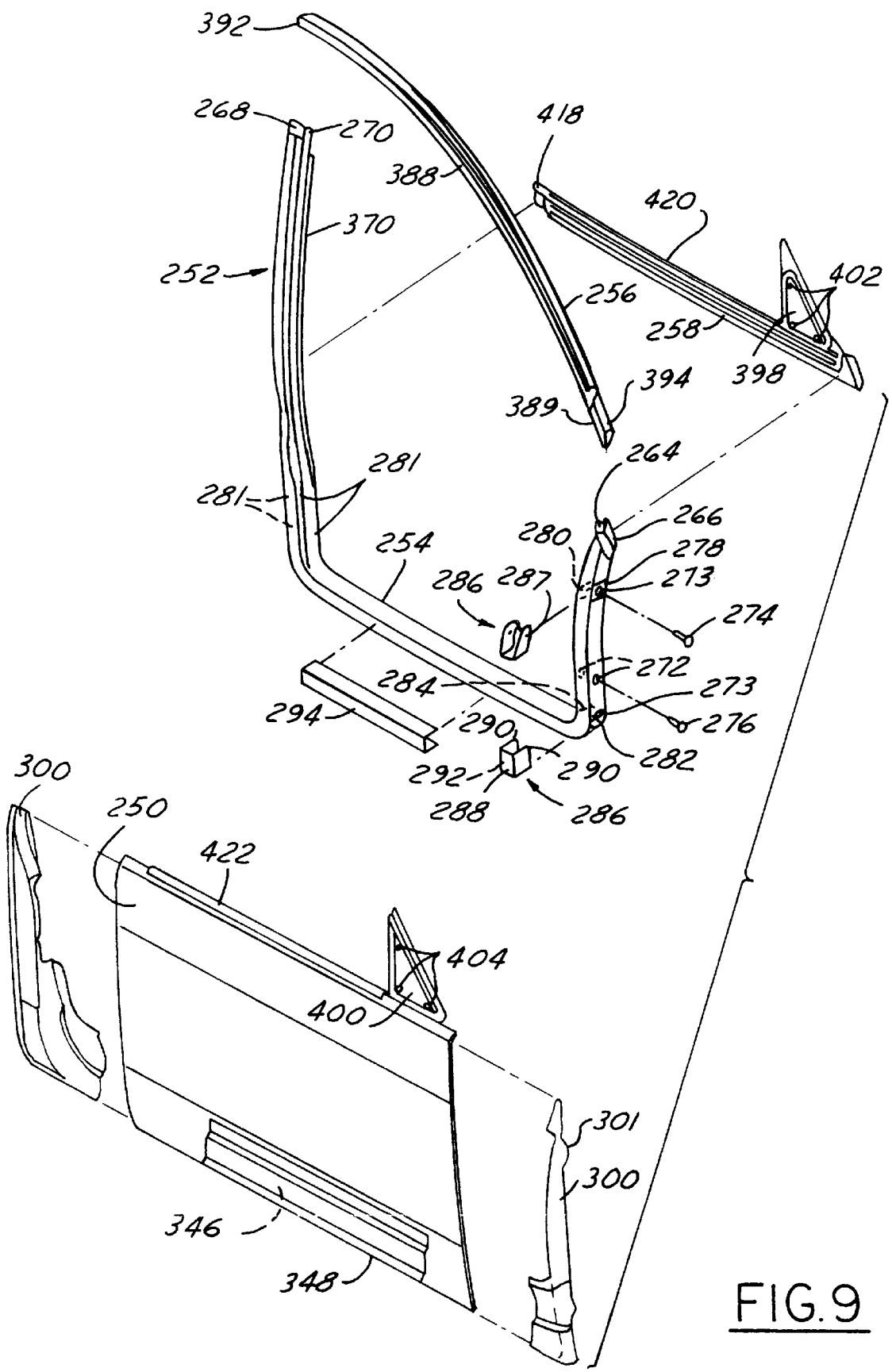
FIG. 9 is an exploded perspective view of a third embodiment of the invention, in which a lower door frame of a frame integrated front door of an automobile is hydroformed.

The exploded view of FIG. 9 shows various individual elements which are combined together to form a frame integrated right front vehicle door. Each of these elements is steel unless otherwise specified. It is to be understood that a frame integrated left front vehicle door has a construction including elements arranged as a mirror image of FIG. 9. The individual elements shown in FIG. 9 include a stamped outer front door panel 250 and a door frame 252. The door frame 252, in turn, includes a tubular one-piece hydroformed lower door frame 254 having a hollow interior, a roll formed upper door frame 256 and an inner front door beltline reinforcement member 258.

The hydroformed lower door frame 254 is produced in a manner similar to the rear window frame 104 of the previously described embodiment. Differences between the lower door frame 254 and the window frame 104 result from a differently shaped mold or tool producing the overall shape and the surface contour of the finished hydroformed element. The tube forming the lower door frame 254 is shaped so that it has an overall approximately "U" shape as shown in FIG. 9 and a trapezoidal or quadrilateral cross section throughout its length. The mold or tool by which the frame 254 is hydroformed additionally defines alignment protrusions 278, 280, 282 and 284 at locations at which hinge elements 274 and 276 of upper and lower hinges are to be mounted. Approximately "U" shaped reinforcing brackets 286, having bases 288 and legs 290, are received over the exterior of the frame 254 at appropriate locations. Each leg of these brackets is formed with a recess 292. Each of the recesses 292 is aligned with a respective one of the protrusions 278, 280, 282 and 284 to facilitate mounting of the brackets. The brackets are welded in place in order to reinforce the portions of the door frame 254 to which the hinge elements 274 and 276 are mounted.

Several additional operations are performed on the lower door frame 254 after it has been hydroformed. More specifically, after hydroforming, the ends of the door frame are subjected to milling operations, during which the front and rear walls of each end are ground down so as to define opposing lateral flanges 264, 266 and 268, 270. Bores 272 are also defined in the front and rear walls for receiving a door check arm (not shown in FIG. 9). A hole 273 is additionally provided in an appropriate location of each protrusion for connection of the hinge elements 274 and 276 as will be described. Two aligned pairs of holes 281 are also provided in a rear portion of the door frame 254. These pairs of holes receive latch mounting bolts as will also be described.

FIG. 9 additionally shows a reinforcing front door impact beam 294. This beam is secured to both a central portion of the lower door frame 254 and an interior surface of the outer front door panel 250 to strengthen the panel in a manner which will become apparent.

Figure 10:
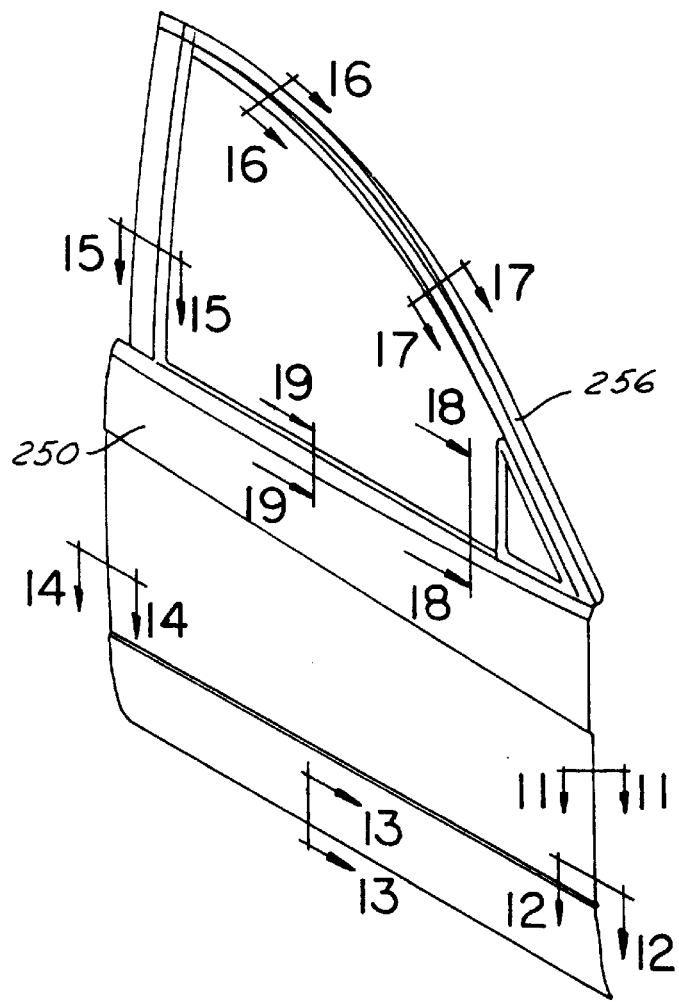
FIG. 10 is a perspective view of the third embodiment with various sections indicated.

Various sections are represented in the frame integrated right front vehicle door shown in FIG. 10. An understanding of the construction and assembly of the right front vehicle door of this embodiment will be facilitated by these sections.

Figure 11:
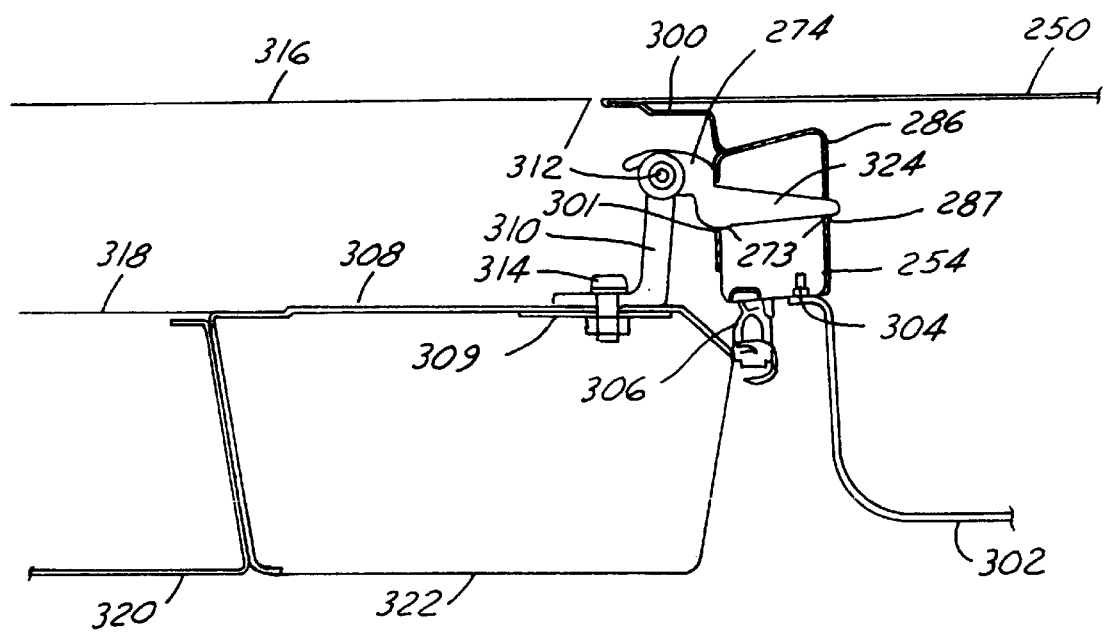
FIG. 11 is a view along section line 11—11 of FIG. 10.

FIG. 11 is a view along section line 11—11 of FIG. 10. This section line passes through the outer front door panel 250 and the lower door frame 254. The hinge element 274 of the upper hinge and the reinforcing bracket 286 are shown. FIG. 11 also shows an inner front door panel 300 to which the outer front door panel 250 is hemmed. The inner front door panel 300 is welded or otherwise secured to corresponding external or outside surfaces of the door frame 254 and the reinforcing bracket 286. FIG. 11 further shows a door trim piece 302 secured by clips or detents 304 within holes formed in the door frame 254, a conventional seal 306 mounted between the body side outer panel 308 and the lower door frame 254, and a hinge base 310 connected by an axle 312 to the hinge element 274 and secured by a bolt or bolts 314 to the body side outer panel 308. A reinforcement part 309 is secured to the body side outer panel 308 for increased strength in the vicinity of the bolt 314. The integrated right front vehicle door pivots about the axle 312 and the corresponding axle of the lower hinge so as to open and close. A front fender 316, an outer rail fender support 318, an inner rail fender support 320 and an inner lower A-pillar panel 322, all of which are conventional vehicle front end components, are also shown. A nose section 324 of the hinge element 274 protrudes through a hole 301 (also indicated in FIG. 9) defined in the inner front door panel 300, through the holes 273 drilled into or otherwise defined in an associated pair 278, 280 of the protrusions of the hydroformed lower door frame, and through corresponding aligned holes 287 in the reinforcing bracket 286 and is welded in place. A nose section of the hinge element 276 is similarly welded in place.

Figure 12:
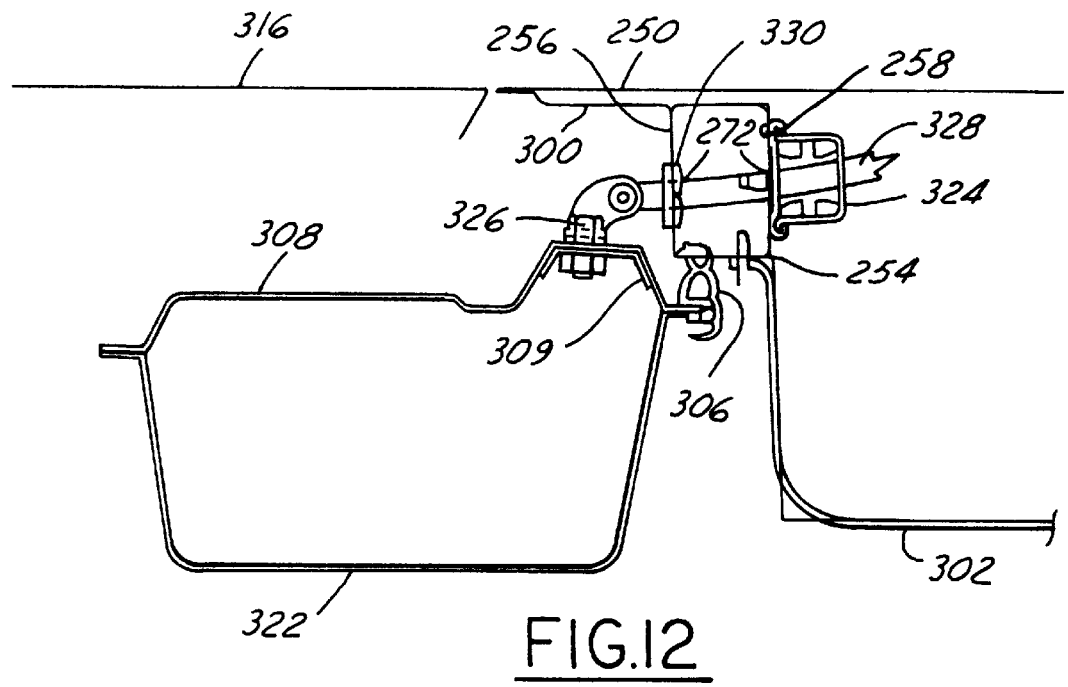
FIG. 12 is a view along section line 12—12 of FIG. 10.

The view along section line 12—12 shown in FIG. 12 is quite similar to that along section line 11—11 shown in FIG. 11, and an unnecessarily repetitive description of those elements previously described in connection with FIG. 11 is not provided here. FIG. 12 differs from FIG. 11 primarily in that the reinforcing bracket 286 does not appear and in that a conventional door check assembly 324, having a door check arm 328 anchored by a bolt 326 to the body side outer panel 308 and the reinforcement part 309, is illustrated. The door check arm 328 passes through the bores 272 defined in the front and rear walls 256 and 258 of the hydroformed lower door frame 254. A wear resistant grommet 330 is provided in the bore 272 of the front wall 256.

Figure 13:
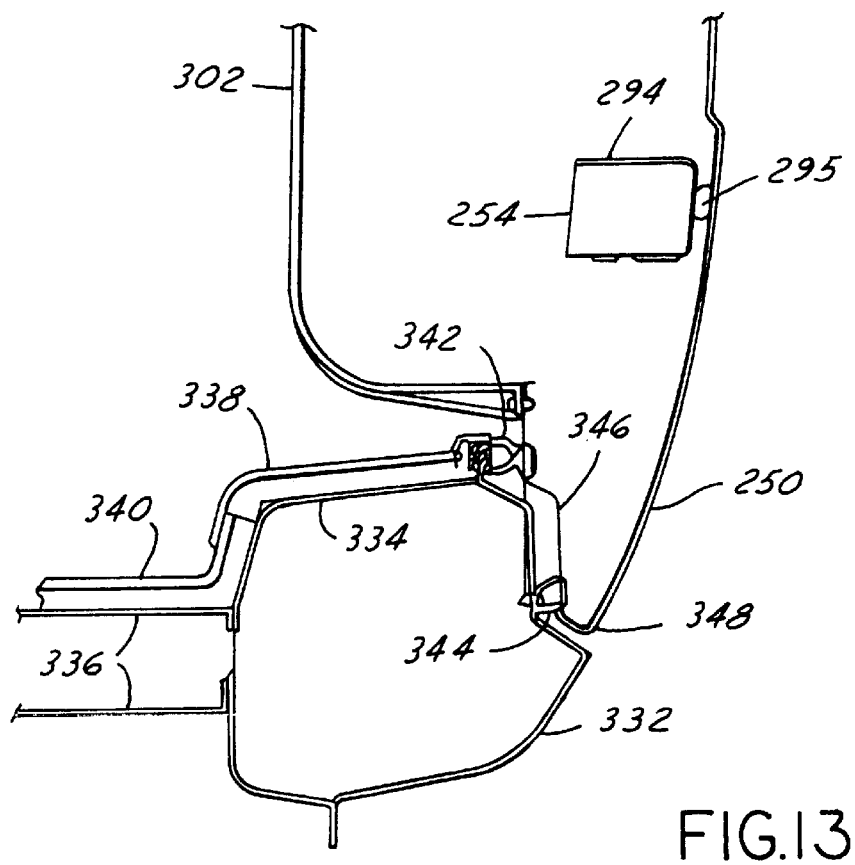
FIG. 13 is a view along section line 13—13 of FIG. 10.

FIG. 13 is a view along section line 13—13 of FIG. 10 and illustrates, in section, the outer front door panel 250, the hydroformed lower door frame 254, the reinforcing front door impact beam 294 and the door trim piece 302, all of which have been mentioned above. An adhesive bead 295 helps secure an inner surface of the outer front door panel 250 to the impact beam 294. FIG. 13 also illustrates a body side outer panel 332, an inner rocker panel 334 welded or otherwise secured to the outer panel 332, a two-part front floor pan 336 attached to the inner rocker panel, interior trim elements 338 and 340 disposed over the inner rocker panel 334 and the front floor pan 336, respectively, and seals 342 and 344 secured to the body side outer panel 332. The seals 342 and 344 contact an interior flange 346 extending upwardly from the underside 348 of the door panel 250 and seal off the vehicle door when the door is closed.

Figure 14:
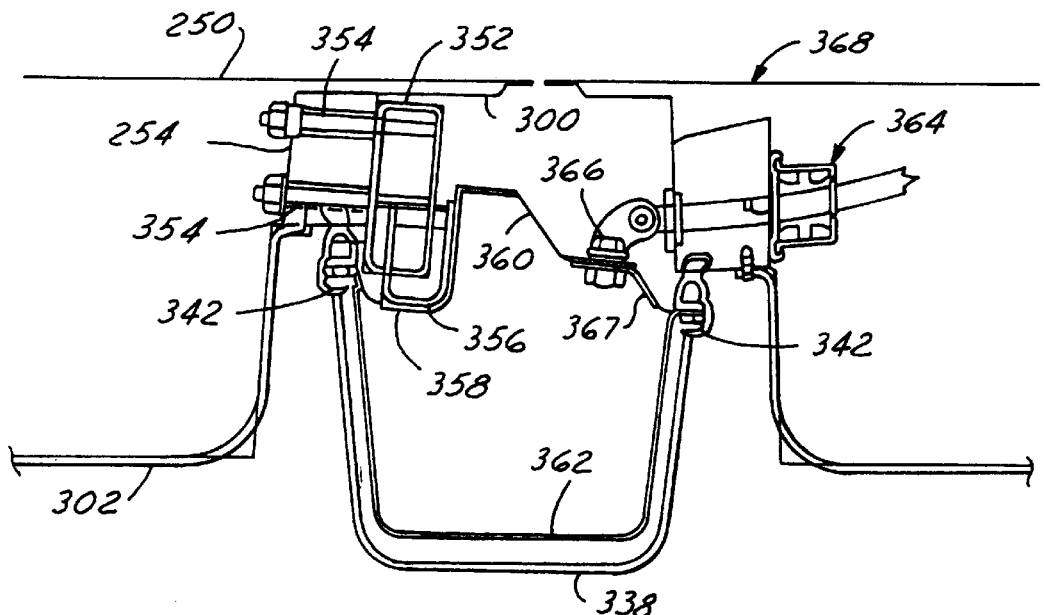
FIG. 14 is a view along section line 14—14 of FIG. 10.

The view along section line 14—14 of FIG. 10 is shown in FIG. 14, which illustrates, in section, the outer front door panel 250, the hydroformed lower door frame 254, the door trim piece 302, an interior trim element 338 and seals 342 such as those mentioned above. Another portion of the inner front door panel 300 is also shown hemmed to the panel 250.

A door latch 352 is connected by bolt assemblies 354 to the lower door frame 254. Each of the bolt assemblies 354 passes through an aligned pair of the holes 281 mentioned above. A catch 356 and a corresponding catch reinforcement 358 are secured to opposing inner and outer surfaces of a body side outer panel 360. The catch 356 cooperates with the door latch 352 to selectively retain the right front vehicle door in its closed position. An inner B-pillar panel 362 is secured together with the body side outer panel 360.

A door check assembly 364, substantially the same as the conventional door check assembly 324 discussed above, has a door check arm anchored by a bolt 366 to the body side outer panel 360 and a reinforcement part 367 which functions in the same manner as the reinforcement part 309. The door check arm passes into the interior of a right rear vehicle door generally designated 368.

Figure 15:
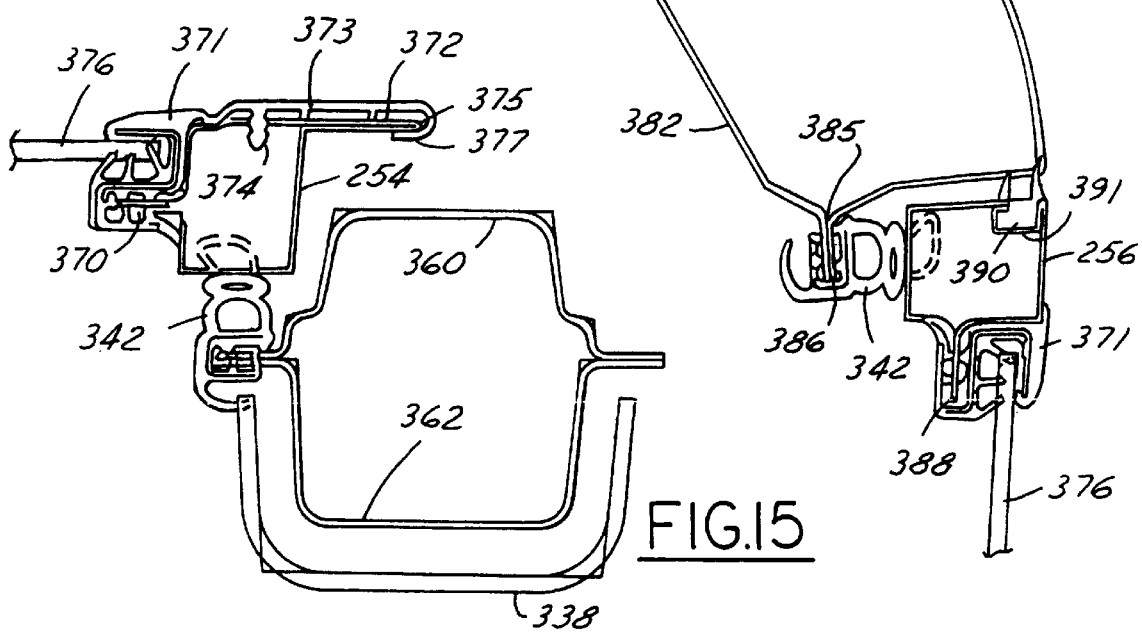
FIG. 15 is a view along section line 15—15 of FIG. 10.

The view in FIG. 15 is along section line 15—15 of FIG. 10 and shows, in section, the hydroformed lower door frame 254, an interior trim element 338, a seal 342, the body side outer panel 360 and the inner B-pillar panel 362. FIG. 15 also shows the door frame 254 as including front and rear recurved sections defining flanges 370 and 372. An additional flattening operation (e.g., rolling or stamping) may be used to properly flatten the flanges 370 and 372. The flange 370 forms a mounting area for a conventional elastomeric window seal element 371 defining a recess within which a right front door window glass element 376 may move up and down. An end 377 of a frame trim element 373 is clipped over an edge 375 of the flange 372. The frame trim element is retained in position by clips or detents 374 received in appropriate holes formed in the lower door frame 254.

Figure 16:
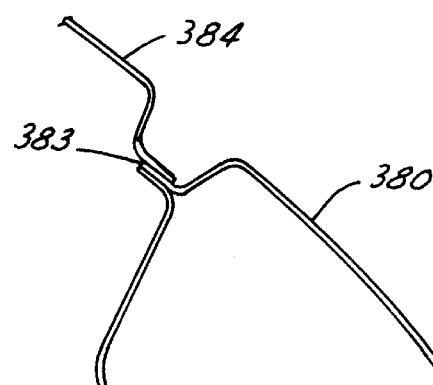
FIG. 16 is a view along section line 16—16 of FIG. 10.

The view shown in FIG. 16 is along section line 16—16 in FIG. 10 and shows, in section, the roll formed upper door frame 256, a seal 342, a window seal element 371 and the window glass element 376. Also shown in FIG. 16 are an outer body side panel 380, an inner roof rail panel 382 and a roof panel 384. These panels are welded or otherwise secured together at connection locations 383 and 385. A flange 386 to which the seal 342 may be adhesively secured is defined at the connection location 385. Sides of the roll formed upper door frame 256 are joined together to form a flange 388 on which the window seal element 371 can be adhesively secured.

As is best shown in FIG. 9, a rear end 392 of the roll formed upper door frame 256 is connected, by welding, between the opposing lateral flanges 268 and 270 defined at one end of the hydroformed lower door frame 254, while a front end 394 of the door frame is similarly connected, by welding, between the opposing lateral flanges 264 and 266 defined at the other end of the lower door frame 254. A recess 391 shown in FIG. 16 is formed in and extends along an upper surface of the upper door frame 256. The recess 391 receives the base of an exterior door frame seal 390 provided between the upper door frame 256 and the outer body side panel 380.

Figure 17:
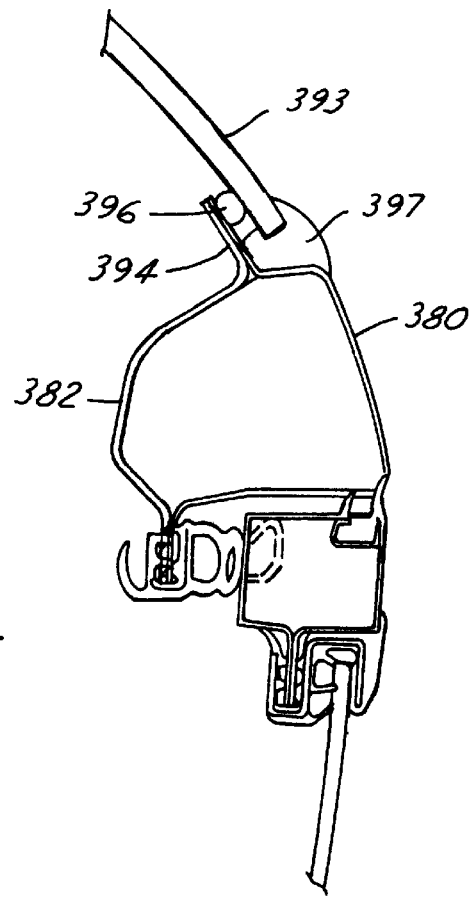
FIG. 17 is a view along section line 17—17 of FIG. 10.

The sectional view along line 17—17 in FIG. 17 is similar to the view shown in FIG. 16 except that, in FIG. 17, a portion of a windshield 393 rather than a portion of the roof panel 384 is illustrated. An adhesive bead 396 secures the windshield 393 to a flange 394 defined by joined surfaces of the outer body side panel 380 and the inner roof rail panel 382. An elastomeric seal element 397 is disposed between the outer body side panel 380 and the windshield 393 to prevent liquid penetration.

Figure 18:
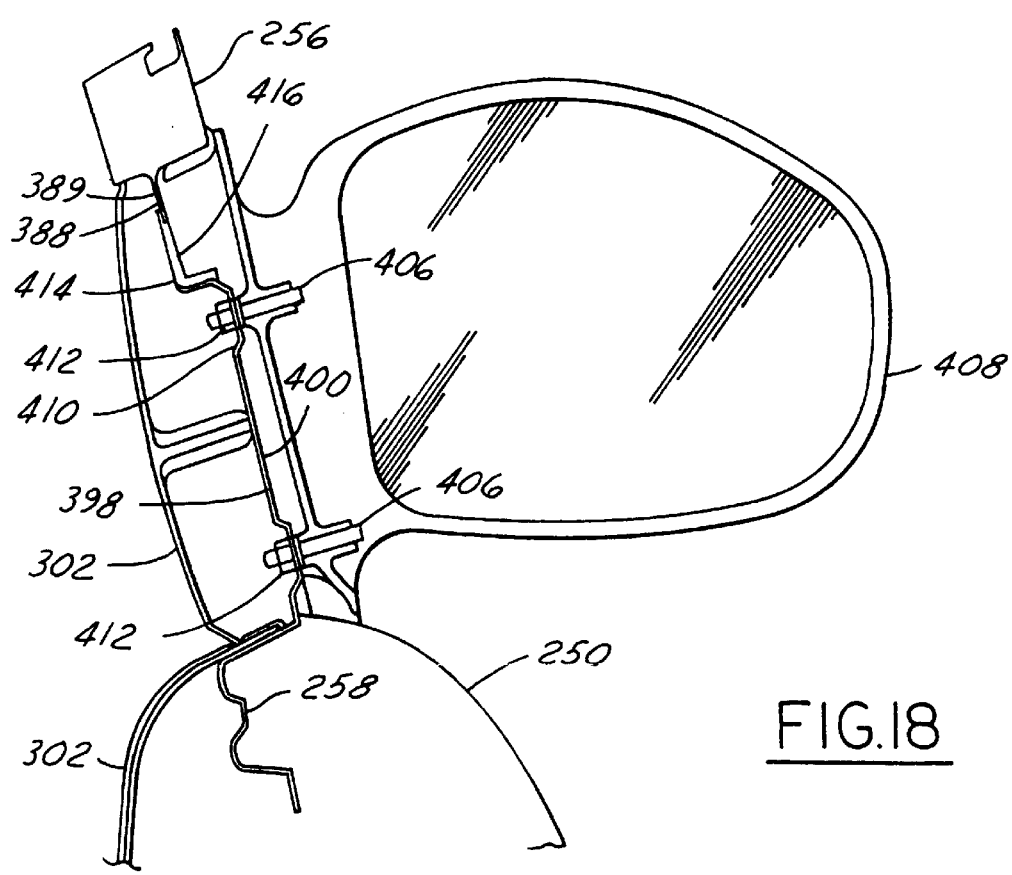
FIG. 18 is a view along section line 18—18 of FIG. 10.

FIG. 18 is a sectional view along line 18—18 of FIG. 10 and shows the outer front door panel 250, the roll formed upper door frame 256 and door trim pieces 302, all of which have been described or mentioned above. FIG. 18 also includes a section of the inner front door beltline reinforcement member 258 which has a triangular door mirror mounting bracket or projection 398 defined thereon. The outer front door panel 250 is formed with a triangular door attachment bracket or projection 400 which, as FIG. 9 illustrates, has the same configuration as the projection 398. Openings 402 are defined in the projection 398 and are aligned with corresponding openings 404 defined in the projection 400 to receive fastening elements, such as screws 406, which are used to secure a door mirror 408 to the exterior of the frame integrated right front vehicle door. The brackets 398 and 400 mate with one another when assembled and are provided with indentations 410 for nuts 412 received on the screws 406. Apices 414 and 416 of the projections 398 and 400, respectively, are spaced from each other so that an end portion 389 of the flange 388 formed on the door frame 256 is receivable between these apices. As FIG. 9 illustrates, a rear end 418 of the beltline reinforcement member 258 is fastened to the lower door frame 254; fastening may be performed, for example, by welding. The front end of the beltline reinforcement member is fastened to the lower door frame by, e.g., welding, and the projection 398 is connected to the outer front door panel 250 by the fastening elements 406 as shown in FIG. 18. Both ends of the beltline reinforcement member are secured to portions of the lower door frame.

Figure 19:
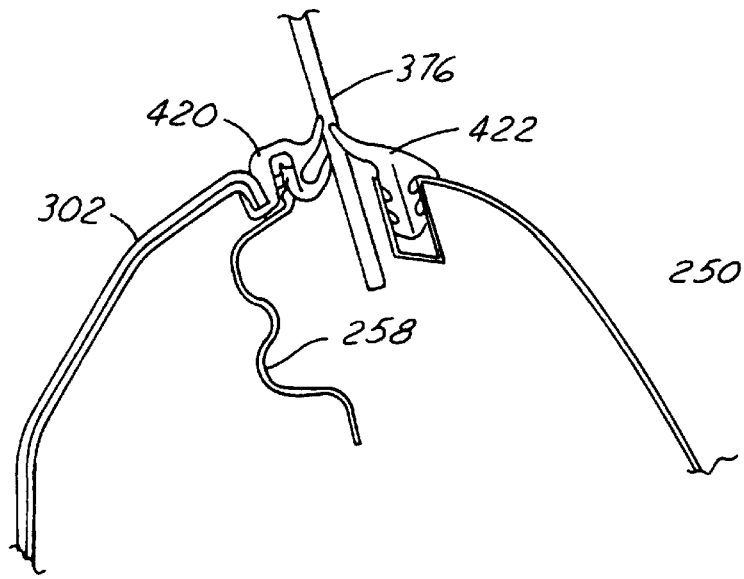
FIG. 19 is a view along section line 19—19 of FIG. 10.

The sectional view along line 19—19 of FIG. 10 shown in FIG. 19 illustrates the outer front door panel 250, the beltline reinforcement member 258, the door trim piece 302 and the window glass element 376, all of which have been described earlier. Also shown in FIG. 19 are an inner window seal 420 mounted to the reinforcement member 258 and the door trim piece 302, and an outer window seal 422 mounted to the outer front door panel 250.

To summarize the construction of the frame integrated right front vehicle door shown in FIG. 10, the upper door frame 258 is roll formed and then welded to the lower door frame as mentioned previously. The lower door frame is hydroformed. The outer panel is a normal stamped part and simply covers the door frame without performing any structural function.

The exploded view of FIG. 20 shows various individual elements which are combined together to form a "frameless" right front vehicle door represented in FIGS. 20–23. Many of the elements together forming the frameless right front door of FIGS. 20–23 are the same as or similar to elements forming the frame integrated vehicle door illustrated in FIGS. 9–19. Elements in FIGS. 20–23 which are the same as or similar to elements shown in FIGS. 9–19 are indicated by the same reference numbers except that, in FIGS. 20–23, the reference numbers are followed by a prime symbol.

Included in the exploded view of FIG. 20 are illustrations of a stamped outer front door panel 250' including an interior flange 346' and an outer window seal 422' provided thereon, a hydroformed door frame 254' including bores 272', holes 273' and 281' and a protrusion 282', and a beltline reinforcement member 258' having a rear end 418' and a front end which will be described shortly. FIG. 20 also shows a reinforcing bracket 286' which is received on the exterior of the frame 254' at the appropriate location over the protrusion 282' and welded in place in the same manner as the reinforcing bracket 286 of FIG. 9. The reinforcing front door impact beam 294' is secured to the door frame and an interior surface of the outer panel 250' in the same way as the impact beam 294 of the embodiment shown in FIGS. 9–19. Finally, an inner front door panel 300' is partially shown in FIG. 20. The outer front door panel 250' is hemmed to the inner front door panel 300' in the same manner as the panel 300 of the previously described embodiment is hemmed to the panel 250. More specifically, the inner front door panel 300' has the outer front door panel 250' hemmed to it. The inner panel 300' is welded or otherwise secured to outside surfaces of the door frame 254' and the reinforcing bracket 286'. The panel 300' is provided with a hole 301' for the same reason that the panel 300 is provided with the hole 301. FIG. 20 additionally shows the lower hinge element 276' which has a nose section configured to extend through the hole 301', through the holes in the bracket 286', and through the holes 273'. The lower hinge element 276' is secured in place on the hydroformed door frame 254' in the same way as that by which the lower hinge element 276 is secured in place.

A rear end of the hydroformed door frame 254' defines a laterally outwardly opening notch 440 configured to receive a protrusion or indentation 442 provided at the rear end 418' of the reinforcement member 258'. Proper alignment during welding is facilitated by the notch and indentation. The front end of the hydroformed door frame and the front end of the reinforcement member 258' are connected together by a die cast steel front door remote mirror bracket 450 as will be described.

The bracket 450 of the front door remote mirror has the functions of locating and fixing the beltline reinforcement member 258' and the hydroformed door frame 254' together. The bracket 450 includes an attachment area 451 at which the bracket is secured, by welding, to a corresponding attachment area 303' on the inner front door panel 300'. The bracket 450 also defines a pocket 453 configured to receive and be welded to the front end 455 of the hydroformed door frame 254'.

The outer front door panel 250' simply covers the frame 254' and has no structural function. The remote mirror bracket 450 has the multiple functions of holding the mirror, forming an upper hinge and tying the hydroformed door frame 254' together with the beltline reinforcement member 258'.

Figure 21:
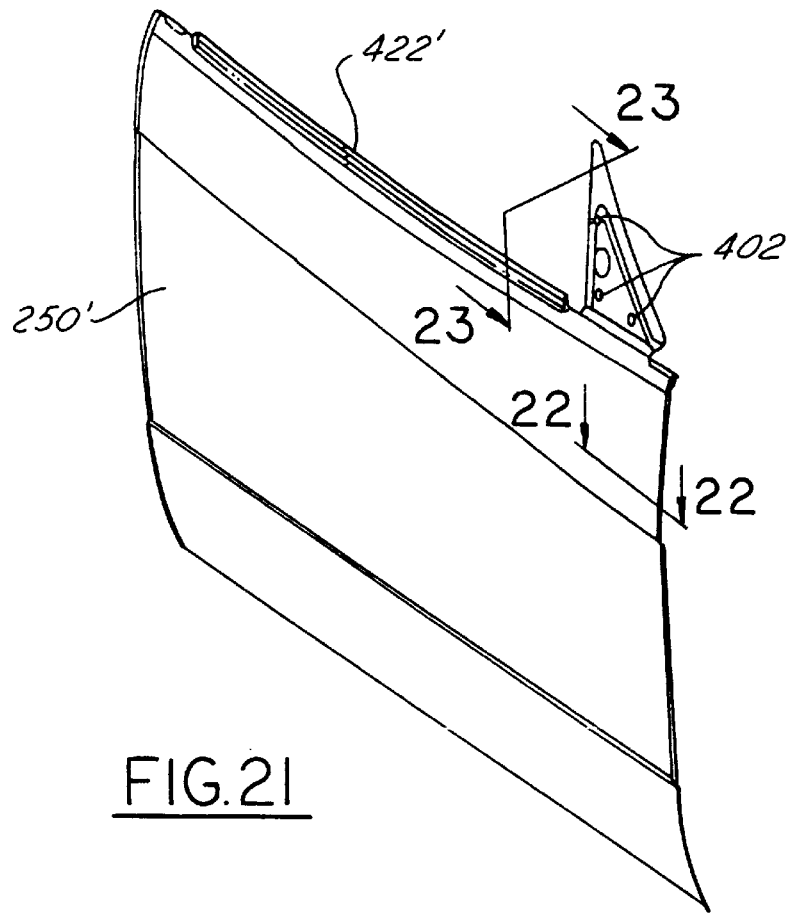
FIG. 21 is a perspective view of the fourth embodiment with several sections indicated.

FIG. 21 is similar to FIG. 10 and represents various sections of the frameless right front vehicle door. The description of these sections which follows will provide an understanding of the construction and operation of the frameless right front vehicle door.

Figure 22:
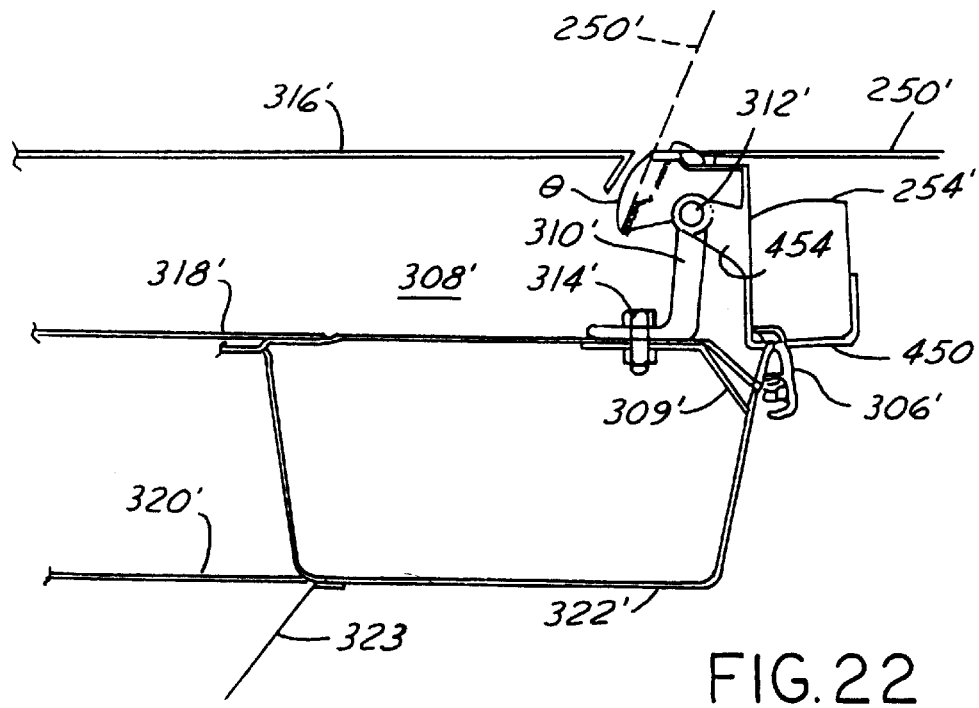
FIG. 22 is a view along section line 22—22 of FIG. 21.

FIG. 22 is a view along section line 22—22 of FIG. 21. This section line passes through the outer front door panel 250', the hydroformed door frame 254', and a hinge element which, in this embodiment, is integrally formed with the die cast bracket 450. As is shown in FIG. 20, the hinge element includes upper and lower ears 452 and 454, respectively. The lower ear 454 is visible in FIG. 22.

Much of the remaining construction of the embodiment of FIGS. 20–23 is the same as that of the embodiment of FIGS. 9–19. FIG. 22 illustrates a conventional seal 306' mounted to the body side outer panel 308' between this panel 308' and the bracket 450 connected to the hydroformed door frame 254'. A hinge base 310' is connected by an axle 312' to the ears 452 and 454 of the hinge element and is secured by a bolt or bolts 314' to the body side outer panel 308'. A reinforcement part 309' is secured to the body side outer panel 308' and to an inner lower A-pillar 322' for increased strength in the vicinity of the bolt 314'. The frameless right front vehicle door pivots about the axle 312' and the corresponding axle of the lower hinge so as to open and close. The door can pivot through an angle θ. A front fender 316', an outer rail fender support 318', an inner rail fender support 320', an inner lower A-pillar panel 322' and a panel dash 323', all of which are conventional vehicle front end components, are also shown.

Figure 23:
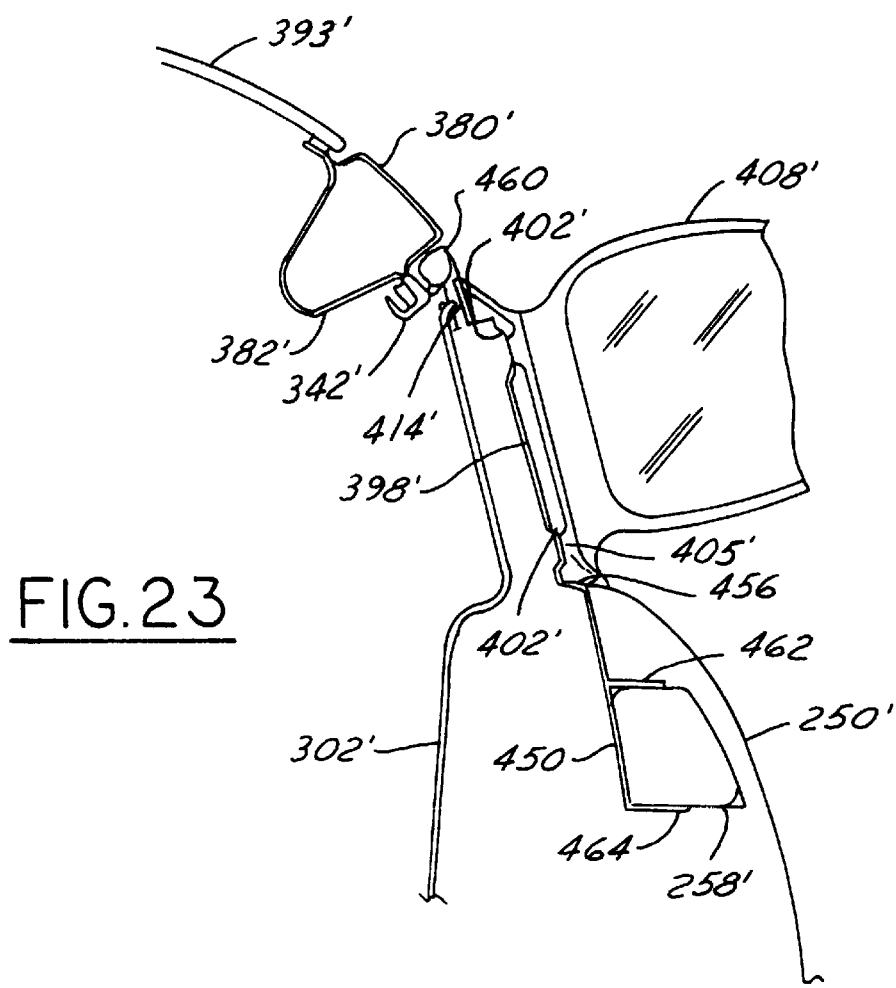
FIG. 23 is a view along section line 23—23 of FIG. 21.

FIG. 23 is similar to FIG. 18 and is a sectional view along line 23—23 of FIG. 21. FIG. 23 shows parts of an outer front door panel 250', an outer body side panel 380', an inner A-pillar panel 382', a windshield 392' and a door trim piece 302', all of which have either been described or mentioned above or are conventional. FIG. 23 also includes a section of the front of the inner front door beltline reinforcement member 258', which is welded to the die cast steel front door remote mirror bracket 450, and of a triangular door mirror mounting bracket or projection 398' defined on the bracket 450. In this embodiment, the outer front door panel 250' is not formed with a triangular door mirror mounting bracket or projection and instead includes a simple flange 456 located forward of the outer window seal 422'. Openings 402', indicated in FIGS. 20, 21 and 23, are defined in the projection 398' and are aligned with corresponding abutments 404' on the body of a door mirror 408'. The abutments have threaded recesses which receive fastening elements, such as screws, used to secure the door mirror 408' to the exterior of the frameless right front vehicle door. The apex 414' of the projection 398' mounts a trim element 460 which contacts the seal element 342' when the door is closed.

The front end of the beltline reinforcement 258' is fastened by welding to the outer side of the mirror bracket 450. As shown in FIG. 23, the bracket 450 defines a pair of outwardly oriented parallel flanges 462 and 464 between which the front end of the beltline reinforcement is received. The flanges 462 and 464 are not visible in FIG. 20.

When assembling the "frameless door", the hydroformed door frame 254', the die cast steel front door remote mirror bracket 450 and the beltline reinforcement member 258' are initially welded or otherwise connected together as a subassembly. The inner front door panel 300' is then attached by welding to this subassembly and the outer front door panel 250' is hemmed to the inner panel 300. Again, the advantage of the embodiment shown in FIGS. 20–23 is that the remote mirror bracket 450 performs the multiple functions of holding the mirror, forming an upper hinge and connecting the hydroformed door frame 254' together with the beltline reinforcement member 258'.

Figure 24:
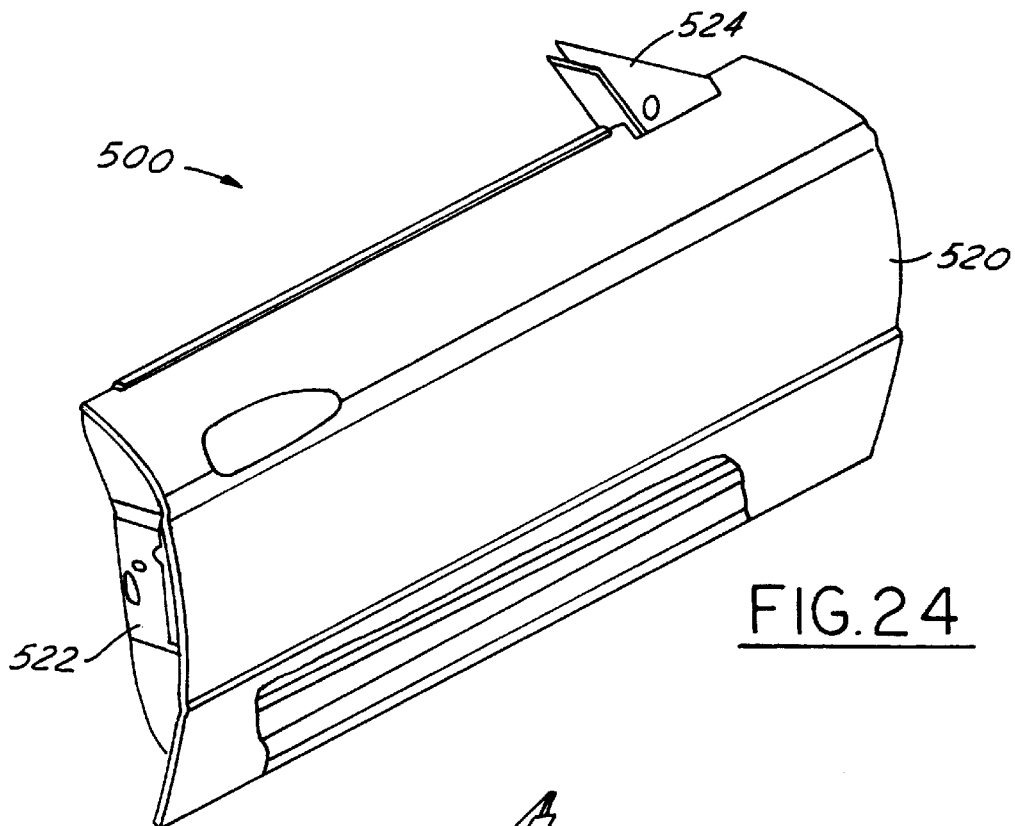
FIG. 24 is a perspective front view of still another embodiment of the invention.
Figure 25:
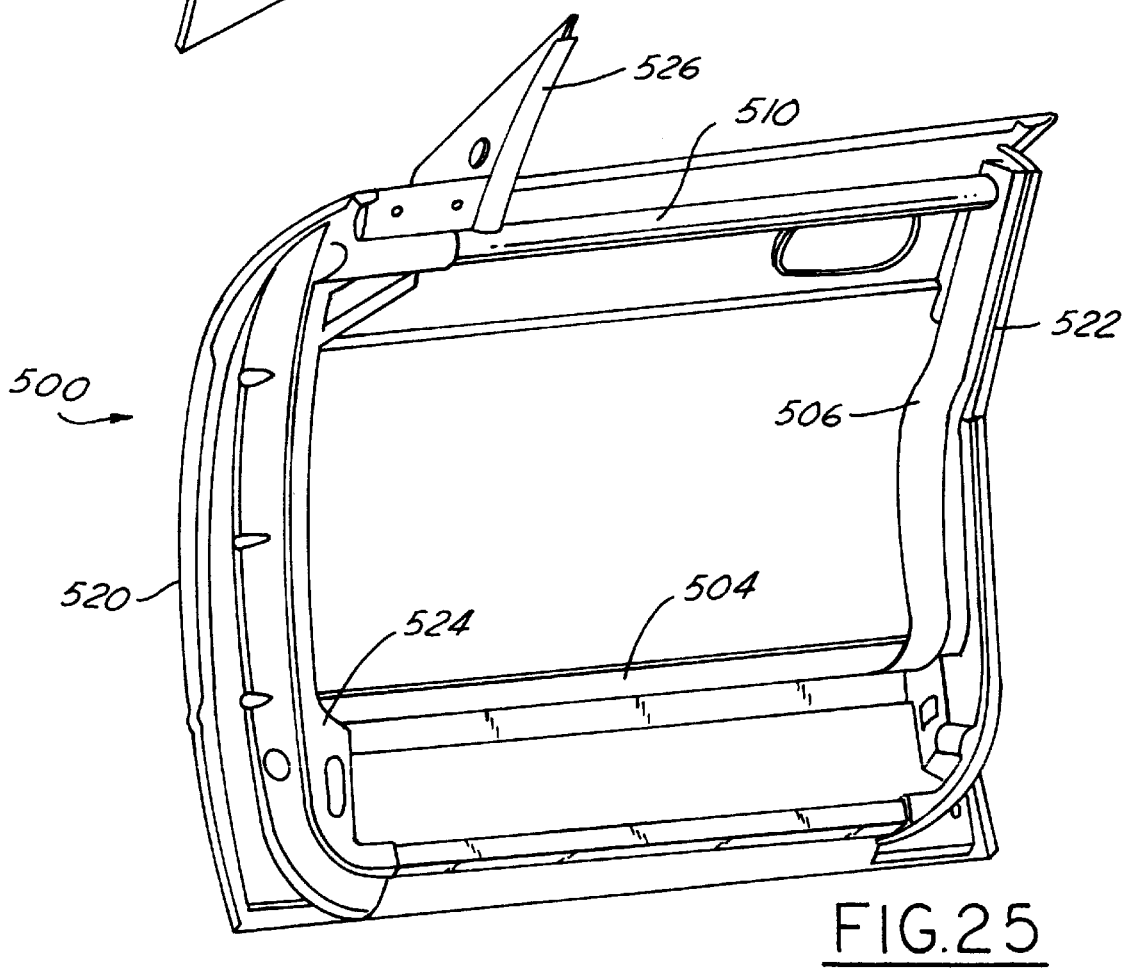
FIG. 25 is a perspective rear view of the embodiment shown in FIG. 24.
Figure 26:
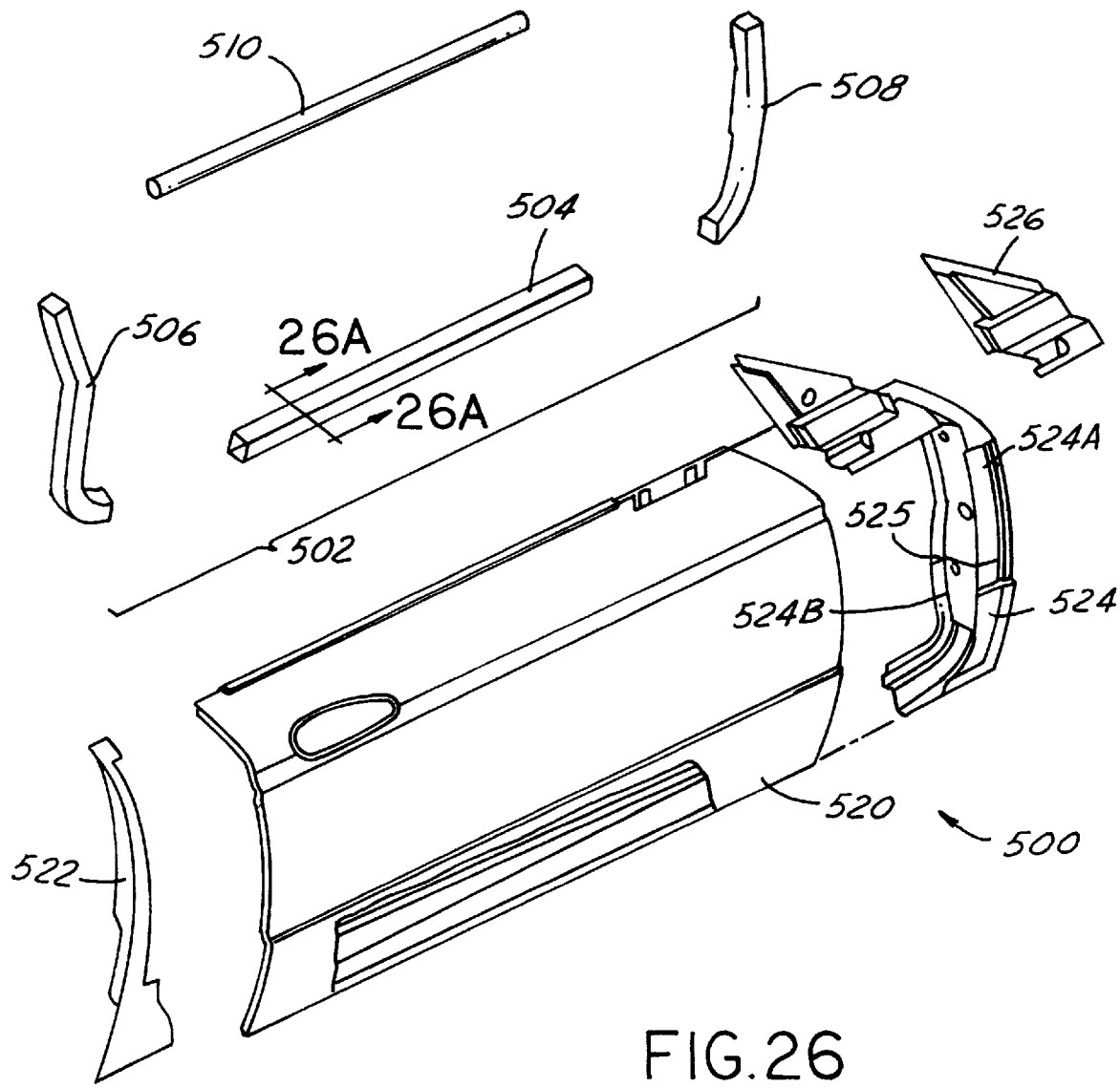
FIG. 26 is an exploded perspective view of the embodiment shown in FIGS. 24 and 25.
Figure 26A:
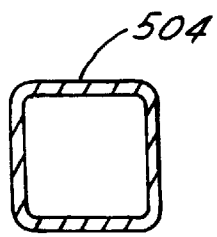
FIG. 26A is a view along section line 26A—26A in FIG. 26.

Another preferred embodiment of a "frameless" door member is shown in FIGS. 24, 25, 26 and 26A, and generally referred to by the reference numeral 500. FIGS. 24 and 25 are front and rear perspective views of the door frame structure 500, while FIG. 26 is an exploded view depicting its components.

The new "frameless" door member 500 includes a subassembly 502, made of four steel structural components, and at least three panel members which are attached to it. More specifically, the subassembly 502 includes a lower horizontally-oriented steel tubular member 504, a first vertically-oriented hydroformed tubular member 506, a second vertically-oriented hydroformed tubular member 508, and an upper horizontally-oriented steel tubular member 510. The lower tubular member 504 is preferably made of an ultra-high strength steel (about 1200 mpa)and has a square or rectangular cross-section (see FIG. 26A). Tubular member 504 is about 30 mm×55 mm in cross-section and has a wall thickness of about 1.4 mm.

The upper tubular member 510 is preferably made of a high strength steel (about 350 mpa) and has a circular or oval cross-section. Tubular member 510 is about 34 mm in diameter and has a wall thickness of about 1 mm. The two hydroformed tubular members 506 and 508 are provided in the sizes and configurations shown and are made in accordance with conventional hydroforming manufacturing operations.

The four components of subassembly 502 are assembled together in a generally rectangular configuration and welded or otherwise securely affixed together. Any of the assembly and fastening techniques and procedures disclosed above can be utilized in this regard. Once the subassembly is completed, the other members and components shown in FIGS. 24–26 are attached to it. In addition, hinges, brackets and other structural members (not shown) are attached to one or more of components 504, 506, 508, 510, in order to provide window tracks, motors for automatic windows, door locking mechanisms and door latching mechanisms. Further, locator holes and moisture drainage holes (not shown) are typically provided in the finished door member 500.

The other components of the frameless door member 500, as shown in FIGS. 24–26, include an outer skin or door panel member 520, a rear inner panel member 522, a front inner panel member 524 and a triangular door mirror mounting bracket 526. These components are made of stamped steel materials, and preferably provided in the shapes and configurations shown. Each of these components are attached, as by welding, to the subassembly 502. The rear inner panel member 522 is about 0.6 mm in thickness and is reinforced by the bends and ridges formed in it. The front inner panel member 524 is preferable a Taylor-blanked component made from two different thicknesses of steel plate materials. For example, the upper part 524A of member 524 is made from steel material about 1.0 mm in thickness while the lower part 524B is made from a slightly thicker steel material about 1.2 mm in thickness. Line 525 depicts the approximate joint between the two thicknesses of steel members.

The hinges can be applied directly to the Taylor-blanked panel member 524 without the need for additional reinforcing or supporting brackets or members. The mirror mounting bracket is used in the same or similar manner to the mirror mounting bracket discussed above with reference to FIGS. 20–23.

The frameless door member 500 eliminates the inner door panels, brackets and the like which typically are provided on conventional vehicles known today. The door member 500 also eliminates the need for a separate reinforcing member contained in some of the embodiments disclosed above. As a result, the door member 500 provides a lower cost structure which is easier to assemble and manufacture.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle door and window frame subassembly comprising:
    a window frame defining first ends,
    a door frame defining second ends, each of said first ends received within one of said second ends, and
    a reinforcement member defining third ends, said third ends forming receptacles within which the first and second ends are received,
    said first, second and third ends being press-fit together by pressurized fluid to join the frames and the reinforcement member together to form the door and window frame subassembly.

2. A vehicle door and window frame subassembly as defined in claim 1, and further comprising flanges defined in said receptacles which position the first, second and third ends properly with respect to one another.

3. A vehicle door and window frame subassembly as defined in claim 1, wherein said window frame includes reduced diameter sections received within said second ends.

4. A vehicle door and window frame subassembly as defined in claim 2, wherein said window frame includes steps which abut said flanges and position the first ends relative to said receptacles.

5. A vehicle door and window frame subassembly as defined in claim 2, wherein each of said second ends abuts an underside of one of the flanges.

6. A vehicle door and window frame subassembly as defined in claim 5, wherein said window frame includes reduced diameter sections received within said second ends.

7. A vehicle door and window frame subassembly as defined in claim 6, wherein said window frame further includes steps defined between said reduced diameter sections and a central portion of the window frame which abut said flanges and position said first ends relative to said receptacles.

8. A vehicle door and window frame subassembly comprising:
tubular hollow frames, and
a reinforcement member defining receptacles within which portions of the tubular hollow frames are received,
said portions of the tubular hollow frames being press-fit within the receptacles by pressurized fluid supplied to an interior of said tubular hollow frames to join the frames and the reinforcement member together to form the door and window frame subassembly.

9. A vehicle door and window frame subassembly as defined in claim 8, wherein said portions of the tubular hollow frames are ends of the frames.

10. A process of making a vehicle door and window frame subassembly comprising the steps of:
providing a reinforcement member having ends defining receptacles,
placing ends of hollow tubular preformed frames into said receptacles, and
supplying pressurized fluid to interiors of said hollow tubular frames to press-fit said ends within said receptacles and form said subassembly.

11. A vehicle hatchback frame subassembly comprising:
a tubular one-piece window frame having a hollow interior and including a central portion disposed between opposing end portions,
inner and outer panels attached to each other and secured to said opposing end portions of said window frame,
said window frame having a cross-sectional configuration produced by supplying pressurized fluid to said hollow interior.

12. A vehicle hatchback frame subassembly as defined in claim 11, and further comprising hinge elements secured within recesses defined in said central portion of the window frame.

13. A vehicle hatchback frame subassembly as defined in claim 11, wherein said window frame is welded to said outer panel.

14. A vehicle hatchback frame subassembly as defined in claim 13, wherein said inner panel is hemmed to said outer panel and welded to said window frame.

15. A vehicle hatchback frame subassembly as defined in claim 11, wherein said window frame defines a ledge which supports a hatchback glass element.

16. A vehicle hatchback frame subassembly as defined in claim 11, and further comprising steps defined on said window frame forming boundaries between said end portions and said central portion.

17. A vehicle hatchback frame subassembly as defined in claim 11, wherein said opposing end portions define respective recesses.

18. A vehicle hatchback frame subassembly as defined in claim 17, wherein said outer panel defines a flange having an underside received within said respective recesses.

19. A process of making a vehicle hatchback frame assembly comprising the steps of:
forming a tubular one-piece window frame having a hollow interior and opposing end portions by supplying pressurized fluid to said hollow interior,
attaching said window frame to an outer hatchback panel,
hemming an inner hatchback panel to said outer hatchback panel and attaching said inner hatchback panel to said window frame to form the vehicle hatchback frame assembly.

20. A process of making a vehicle hatchback frame assembly as defined in claim 19, wherein said window frame is attached to said outer hatchback panel by welding.

21. A process of making a vehicle hatchback frame assembly as defined in claim 20, wherein said inner hatchback panel is attached to said window frame by welding.

22. A process of making a vehicle hatchback frame assembly as defined in claim 21, wherein said welding is laser welding.

23. A vehicle door and window frame subassembly comprising:
a tubular one-piece first door frame having a hollow interior and defining first ends,
a second door frame defining second ends, each of said second ends being connected to said first ends, and
a reinforcement member defining third ends secured to said tubular one-piece first door frame,
said first door frame having cross-sectional configuration produced by supplying pressurized fluid to said hollow interior.

24. A vehicle door and window frame subassembly according to claim 23, wherein said second door frame is a roll formed upper door frame.

25. A vehicle door and window frame subassembly according to claim 23, and further comprising an outer front panel attached to said reinforcement member.

26. A vehicle door and window frame subassembly according to claim 25, wherein said outer front panel is attached to said reinforcement member by at least one mirror bracket.

27. A vehicle door and window frame subassembly according to claim 24, wherein said second door frame is welded to first door frame.

28. A vehicle door and window frame subassembly according to claim 26, wherein said mirror bracket includes mating projections on said reinforcement member and said outer front panel.

29. A vehicle door and window frame subassembly comprising:
a tubular one-piece first door frame having a hollow interior and defining first ends,
a reinforcement member defining second ends, one of said second ends secured to a portion of said tubular one-piece first door frame at a location adjacent one of said first ends, and a bracket interconnecting the other of said second ends to the other of said first ends, said first door frame having a cross-sectional configuration produced by supplying pressurized fluid to said hollow interior.

30. A vehicle door and window frame subassembly according to claim 29, wherein said location adjacent one of said first ends is defined by a notch.

31. A vehicle door and window frame subassembly according to claim 29, wherein said bracket is a mirror bracket which defines a hinge element forming part of a door hinge.

32. A vehicle door and window frame subassembly according to claim 31, wherein said hinge element comprises upper and lower ears integrally formed with said bracket.

33. A vehicle door structure comprising:

a lower tubular member having two ends;

an upper tubular member having two ends;

a first hydroformed tubular member connecting together a first end of said lower tubular member and a first end of said upper tubular member; and a second hydroformed tubular member connecting together the second end of said lower member and the second end of said upper tubular member;

said lower hydroformed tubular member, upper member and said second tubular member being assembled and secured together to form a door subassembly.

34. The vehicle door structure as defined in claim 33 wherein said upper tubular member, said lower tubular member, said first hydroformed tubular member and said second hydroformed tubular member are each made of a steel material.

35. The vehicle door structure as defined in claim 33 wherein said lower tubular member is made of an ultra-high strength steel material, and said upper tubular member is made of a high strength steel material.

36. The vehicle door structure as defined in claim 33 further comprising an inner front panel member, an inner rear panel member and a door panel member all attached to said door subassembly.

37. The vehicle door structure as defined in claim 36 further comprising a door mirror bracket member connected to said door subassembly.

38. The vehicle door structure as defined in claim 36 wherein said inner front panel member is a Taylor-blanked member made from at least two pieces of steel material, each of said pieces having a different thickness.

* * * * *

Disclaimer 6,015,182—Ulrich Weissert, Rochester; Okan Goenueldinc, Birmingham; Marco Cercone, Troy; Ross Winslow, Royal Oak, all of Mich.; Andy Wolf, Parkland, Fla.; Robert Koehr, Harrison Township, Mich.; Rolf Heyll, Renningen, Germany. VEHICLE DOOR STRUCTURES INCORPORATING HYDROFORMED ELEMENTS AND PROCESSES FOR ASSEMBLING SUCH ELEMENTS. Patent dated January 18, 2000. Disclaimer filed on September 24, 2001, by the Assignee, Ultralite Steel Auto Closures Consortium.

Hereby enters this disclaimer to the entire term of said patent.

*(Official Gazette, July 22, 2003)*